（12）United States Patent
Unnikrishnan et al.

(10) Patent No.: US 11,461,915 B2
(45) Date of Patent: Oct. 4, 2022

(54) OBJECT SIZE ESTIMATION USING CAMERA MAP AND/OR RADAR INFORMATION

(71) Applicant: QUALCOMM Incorporated, San Diego, CA (US)

(72) Inventors: Jayakrishnan Unnikrishnan, Jersey City, NJ (US); Avdhut Joshi, Carlsbad, CA (US); Shivam Agarwal, San Diego, CA (US); Yoga Y Nadaraajan, San Diego, CA (US); Amir Salimi, La Jolla, CA (US); Urs Niesen, Berkeley Heights, NJ (US); Sree Sesha Aravind Vadrevu, San Diego, CA (US); Gautam Sachdeva, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/142,199

(22) Filed: Jan. 5, 2021

(65) Prior Publication Data

US 2021/0209785 A1    Jul. 8, 2021

Related U.S. Application Data

(60) Provisional application No. 62/957,638, filed on Jan. 6, 2020.

(51) Int. Cl.
*G06T 7/62* (2017.01)
*G06T 7/73* (2017.01)
(Continued)

(52) U.S. Cl.
CPC ............... *G06T 7/62* (2017.01); *G01S 13/06* (2013.01); *G01S 13/89* (2013.01); *G06T 7/75* (2017.01); *G06T 2207/10028* (2013.01)

(58) Field of Classification Search
CPC ......... G05D 1/0251; G06T 17/00; G06T 7/12; G06T 17/05; G06T 7/593; G06T 7/292;
(Continued)

(56) References Cited

U.S. PATENT DOCUMENTS

| 2005/0270286 | A1* | 12/2005 | Hirvonen | G06V 20/653 |
| | | | | 345/422 |
| 2021/0043002 | A1* | 2/2021 | Zeng | G06V 20/70 |

FOREIGN PATENT DOCUMENTS

CN        110163904 A        8/2019

OTHER PUBLICATIONS

International Search Report and Written Opinion—PCT/US2021/012984—ISA/EPO—dated Apr. 26, 2021.
(Continued)

*Primary Examiner* — Phuoc H Doan
(74) *Attorney, Agent, or Firm* — Polsinelli LLP

(57) ABSTRACT

Techniques and systems are provided for determining one or more sizes of one or more objects. For example, a bounding region identifying a first object detected in an image can be obtained. A map including map points can also be obtained. The map points correspond to one or more reference locations in a three-dimensional space. The bounding region identifying the first object can be associated with at least one map point of the map points included in the map. Using the bounding region and the at least one map point, an estimated three-dimensional position and an estimated size of the first object detected in the image can be determined. In some examples, other information can be used to estimate the estimated three-dimensional position and an estimated size of the first object, such as radar information and/or other information.

48 Claims, 21 Drawing Sheets

(51) Int. Cl.
*G01S 13/89* (2006.01)
*G01S 13/06* (2006.01)

(58) Field of Classification Search
CPC ........... G06T 7/62; G06T 5/002; G06T 19/00; G06T 7/74; G06T 2207/10028; G06K 9/6262
USPC .......................................... 382/100; 345/422
See application file for complete search history.

(56) References Cited

OTHER PUBLICATIONS

Redmon J., et al., "You Only Look Once: Unified, Real-Time Object Detection," May 9, 2016 (May 9, 2016), pp. 1-10, XP055556774, DOI: 10.1109/CVPR.2016.91, arXiv: 1506.02640v5, Retrieved from the Internet: URL: https://arxiv.org/pdf/1506.02640.pdf [retrieved on Feb. 14, 2019], The whole document.

* cited by examiner

1800

OBTAIN A BOUNDING REGION IDENTIFYING A FIRST OBJECT
DETECTED IN AN IMAGE
1802

OBTAIN A MAP INCLUDING A PLURALITY OF MAP POINTS, THE
PLURALITY OF MAP POINTS CORRESPONDING TO ONE OR MORE
REFERENCE LOCATIONS IN A THREE-DIMENSIONAL SPACE
1804

ASSOCIATE THE BOUNDING REGION IDENTIFYING THE FIRST OBJECT
WITH AT LEAST ONE MAP POINT OF THE PLURALITY OF MAP POINTS
INCLUDED IN THE MAP
1806

DETERMINE, USING THE BOUNDING REGION AND THE AT LEAST ONE
MAP POINT, AN ESTIMATED THREE-DIMENSIONAL POSITION AND AN
ESTIMATED SIZE OF THE FIRST OBJECT DETECTED IN THE IMAGE
1808

FIG. 18

OBJECT SIZE ESTIMATION USING CAMERA MAP AND/OR RADAR INFORMATION

CROSS-REFERENCE TO RELATED APPLICATIONS

This application claims the benefit of, and priority to, U.S. Provisional Patent Application No. 62/957,638, filed on Jan. 6, 2020, entitled "OBJECT SIZE ESTIMATION USING CAMERA MAP AND RADAR INFORMATION," the contents of which are hereby expressly incorporated by reference in its entirety.

FIELD

The present disclosure generally relates to determining the size (and in some cases position) of objects, and more specifically to techniques and systems for determining the size and/or position of objects using camera map, radar information, and/or other information.

BACKGROUND

Object detection and tracking can be used to identify an object (e.g., from a digital image or a video frame of a video clip) and track the object over time. Object detection and tracking can be used in different fields, including autonomous driving, video analytics, security systems, robotics, aviation, among many others. In some fields, an object can determine positions of other objects in an environment so that the object can accurately navigate through the environment. Further, in order to make accurate motion planning and trajectory planning decisions, the object should have the ability to accurately estimate the size of the other objects. However, the sizes of different objects can vary, and the sizes of objects having a same category or classification can also vary.

One example of a field where an object needs to be able to determine the position and size of other objects is autonomous driving by autonomous driving systems (e.g., of autonomous vehicles). A critical requirement for autonomous driving (e.g., at autonomy levels 3 and higher) is the ability of an autonomous vehicle to detect and track other vehicles around the autonomous vehicle. While some autonomous vehicles may be able to determine a classification or category of another vehicle, the three-dimensional (3D) sizes of vehicles can have large variance even within the same classification or category. In order to make accurate motion planning and trajectory planning decisions, autonomous driving systems should be able to accurately estimate the 3D size, especially the length, of other vehicles on the road. Similar functionality can be useful or necessary for other systems, such as robotics systems, aviation systems (e.g., unmanned aerial vehicles among others), and/or other systems with similar needs.

SUMMARY

Systems and techniques are described herein for determining the size (and in some cases position and/or orientation) of objects using various types of information, such as camera map information, radar information, and/or other information. According to one illustrative example, a method of determining one or more sizes of one or more objects is provided. The method includes: obtaining a bounding region identifying a first object detected in an image; obtaining a map including a plurality of map points, the plurality of map points corresponding to one or more reference locations in a three-dimensional space; associating the bounding region identifying the first object with at least one map point of the plurality of map points included in the map; and determining, using the bounding region and the at least one map point, an estimated three-dimensional position and an estimated size of the first object detected in the image.

In another example, an apparatus for determining one or more sizes of one or more objects is provided that includes a memory configured to store one or more images and one or more processors implemented in circuitry and coupled to the memory. The one or more processors are configured to and can: obtain a bounding region identifying a first object detected in an image; obtain a map including a plurality of map points, the plurality of map points corresponding to one or more reference locations in a three-dimensional space; associate the bounding region identifying the first object with at least one map point of the plurality of map points included in the map; and determine, using the bounding region and the at least one map point, an estimated three-dimensional position and an estimated size of the first object detected in the image.

In another example, a non-transitory computer-readable medium is provided that has stored thereon instructions that, when executed by one or more processors, cause the one or more processor to: obtain a bounding region identifying a first object detected in an image; obtain a map including a plurality of map points, the plurality of map points corresponding to one or more reference locations in a three-dimensional space; associate the bounding region identifying the first object with at least one map point of the plurality of map points included in the map; and determine, using the bounding region and the at least one map point, an estimated three-dimensional position and an estimated size of the first object detected in the image.

In another example, an apparatus for determining one or more sizes of one or more objects is provided. The apparatus includes: means for obtaining a bounding region identifying a first object detected in an image; means for obtaining a map including a plurality of map points, the plurality of map points corresponding to one or more reference locations in a three-dimensional space; means for associating the bounding region identifying the first object with at least one map point of the plurality of map points included in the map; and means for determining, using the bounding region and the at least one map point, an estimated three-dimensional position and an estimated size of the first object detected in the image.

In some aspects, the first object is a vehicle. In some aspects, the one or more reference locations include lanes on a road in the three-dimensional space.

In some aspects, the method, apparatuses, and computer-readable medium described above further comprise: projecting a subset of map points from the plurality of map points onto the image; determining, from the subset of map points, the at least one map point is a closest map point on the one or more reference locations to the bounding region; and associating the bounding region with the at least one map point based on determining the at least one map point is the closest map point on the one or more reference locations to the bounding region.

In some aspects, the subset of map points are projected onto the image using calibration data and a pose of a camera used to capture the image. In some cases, the subset of map points include map points that are included within a field of view of a camera used to capture the image and that are within a selection range from the camera.

In some aspects, the method, apparatuses, and computer-readable medium described above further comprise: determining the at least one map point intersects with one or more points on an edge of the bounding region. In such aspects, the at least one map point is determined to be the closest map point based on determining the at least one map point intersects with one or more points on an edge of the bounding region. In some cases, the edge of the bounding region includes a bottom edge of the bounding region.

In some aspects, the method, apparatuses, and computer-readable medium described above further comprise: determining a point on an edge of the bounding region; and determining the at least one map point is closest to the point on the edge of the bounding region as compared to other map points from the subset of map points. In such aspects, the at least one map point is determined to be the closest map point based on the at least one map point being closest to the point on the edge of the bounding region. In some cases, the edge of the bounding region includes a bottom edge of the bounding region.

In some aspects, determining the estimated three-dimensional position and the estimated size of the first object includes: obtaining a width of the first object; determining an orientation of the first object is parallel to a surface of the map at the at least one map point; determining, based on the width of the first object and the orientation of the first object, a vertex location of a three-dimensional bounding box representing the first object, wherein the vertex location corresponds to a corner of the three-dimensional bounding box closest to a camera used to capture the image; determining, based on the vertex location, the estimated three-dimensional position of the first object; and determining, based on the vertex location and the bounding region, a length and height of the three-dimensional bounding box representing the first object.

In some aspects, the method, apparatuses, and computer-readable medium described above further comprise: obtaining a classification of the first object; and determining, based on the classification, the width of the first object.

In some aspects, the method, apparatuses, and computer-readable medium described above further comprise: obtaining a classification of the first object for the image, the classification defining a type of object; determining, based on the classification of the first object, a minimum size and a maximum size of the first object; and determining the estimated size of the first object based on the minimum size and the maximum size of the first object.

In some aspects, the method, apparatuses, and computer-readable medium described above further comprise: determining a weight for the classification based on a distance between the first object and a second object, the second object including a camera used to capture the image; updating a cumulative weight of the classification based on the weight, the cumulative weight being based on multiple detections from multiple images including the first object; determining a likelihood the first object includes the type of object defined by the classification based on the cumulative weight of the classification; determining the first object includes the type of object based on the determined likelihood and one or more likelihoods associated with one or more other classifications; and determining the minimum size and the maximum size of the first object based on the type of object defined by the classification.

In some aspects, the first object is a first vehicle and the second object is a second vehicle. In some aspects, the type of object defined by the classification includes a type of vehicle for the first vehicle.

In some aspects, the method, apparatuses, and computer-readable medium described above further comprise: obtaining a plurality of radar measurement points, the plurality of radar measurement points being based on radar signals reflected by the first object; and determining an additional estimated size of the first object based on the plurality of radar measurements. In some aspects, the plurality of radar measurement points are obtained using a plurality of radars included on a second object, the second object including a camera used to capture the image.

In some aspects, the method, apparatuses, and computer-readable medium described above further comprise: determining a maximum spread of the radar measurement points along a direction of orientation of the first object; and determining the additional estimated size of the first object based on the maximum spread of the radar measurement points along the direction of orientation of the first object.

In some aspects, the method, apparatuses, and computer-readable medium described above further comprise: determining a size of the first object using an estimation model, the estimated size and the additional estimated size being used as input to the estimation model. In some aspects, the estimation model is a Kalman filter.

In some aspects, the method, apparatuses, and computer-readable medium described above further comprise: obtaining a radar image from an imaging radar; and determining an additional estimated size of the first object based on the radar image.

In some aspects, the method, apparatuses, and computer-readable medium described above further comprise: determining a size of the first object using an estimation model, the estimated size and the additional estimated size being used as input to the estimation model.

In some examples, a vehicle including components for determining one or more sizes of one or more objects is provided. The vehicle can include one or more cameras configured to capture a plurality of images, a memory configured to store the plurality of images, and one or more processors implemented in circuitry and coupled to the memory. The one or more processors are configured to and can perform any of the techniques described above. For example, the one or more processes are configured to and can: obtain a bounding region identifying a target vehicle detected in an image captured by a camera of the one or more cameras; obtain a map including a plurality of map points, the plurality of map points corresponding to one or more lines of a lane on a road; associate the bounding region identifying the target vehicle with at least one map point of the plurality of map points included in the map; and determine, using the bounding region and the at least one map point, an estimated three-dimensional position and an estimated size of the target vehicle detected in the image.

In some aspects, the apparatus is, is part of, and/or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a camera, a vehicle or a computing device or component of a vehicle (e.g., an autonomous vehicle), or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 18 is a flowchart illustrating an example of a process of determining one or more sizes of one or more objects using the techniques described herein, in accordance with some examples.

DETAILED DESCRIPTION

Figure 1:
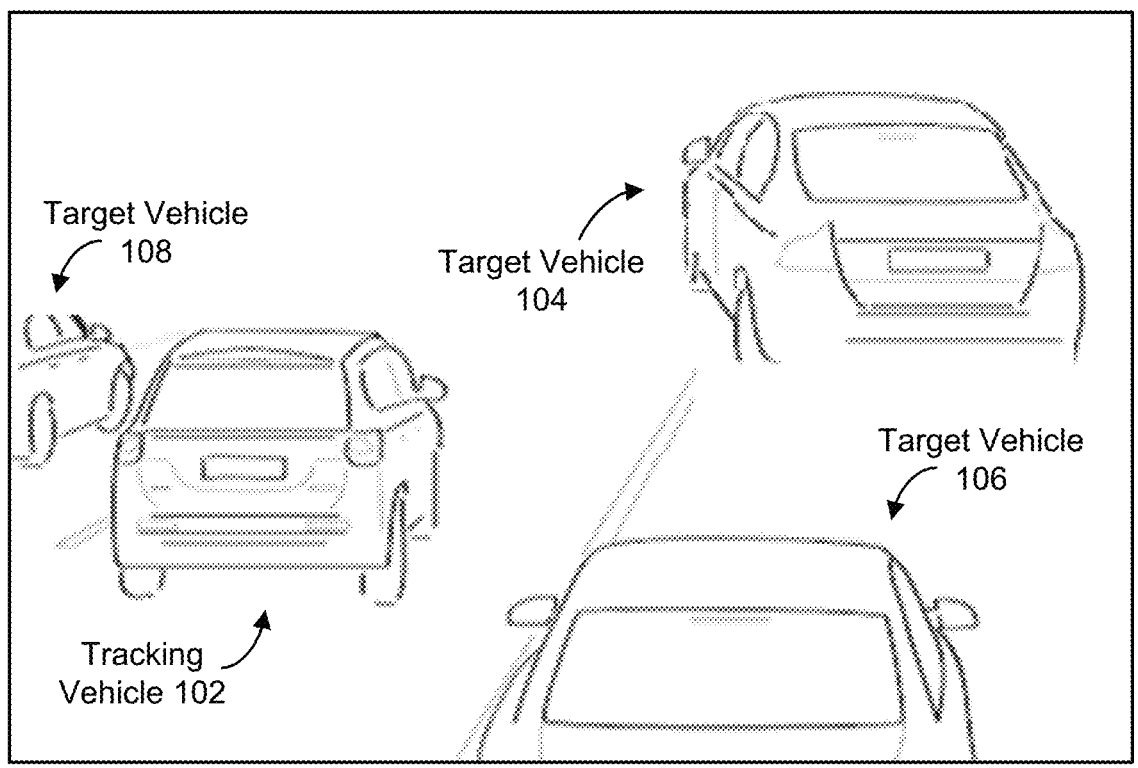
FIG. 1 is an image illustrating multiple vehicles driving on a road, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Object detection and tracking can be used to identify an object and track the object over time. For example, an image of an object can be obtained, and object detection can be performed on the image to detect one or more objects in the image. In some cases, the detected object can be classified into a category of object and a bounding region can be generated to identify a location of the object in the image. Various types of systems can be used for object detection, including neural network-based object detectors.

Object detection and tracking can be used in autonomous driving systems, video analytics, security systems, robotics systems, aviation systems, among others systems. In such systems, an object (referred to as a tracking object) tracking other objects (referred to as target objects) in an environment can determine positions and sizes of the other objects. Determining the positions and sizes of target objects in the environment allow the tracking object to accurately navigate through the environment by making intelligent motion planning and trajectory planning decisions. However, it can be difficult to accurately identify the size of a target object. For example, determining the size of a target object based on a classification or category of the target object can be difficult due to the varying sizes of objects having a same category or classification.

One example of a field where a tracking object needs to be able to determine the position and size of target objects is autonomous driving by autonomous driving systems (e.g., of autonomous vehicles). An important goal of autonomous driving systems is the ability of an autonomous vehicle to detect and track other vehicles around the autonomous vehicle. This is especially the case for higher levels of autonomy, such as autonomy levels 3 and higher. For example, autonomy level 0 requires full control from the driver as the vehicle has no autonomous driving system, and autonomy level 1 involves basic assistance features, such as cruise control, in which case the driver of the vehicle is in full control of the vehicle. Autonomy level 2 refers to semi-autonomous driving, where the vehicle can perform functions such as drive in a straight path, stay in a particular lane, control the distance from other vehicles in front of the vehicle, or other functions own. Autonomy levels 3, 4, and 5 include much more autonomy. For example, autonomy level 3 refers to an on-board autonomous driving system that can take over all driving functions in certain situations, where the driver remains ready to take over at any time if needed. Autonomy level 4 refers to a fully autonomous experience without requiring a user's help, even in complicated driving situations (e.g., on highways and in heavy city traffic). With autonomy level 4, a person may still remain at the in the driver's seat behind the steering wheel. Vehicles operating at autonomy level 4 can communicate and inform other vehicles about upcoming maneuvers (e.g., a vehicle is changing lanes, making a turn, stopping, etc.). Autonomy level 5 vehicles full autonomous, self-driving vehicles that operate autonomously in all conditions. A human operator is not needed for the vehicle to take any action.

FIG. 1 is an image 100 illustrating an environment including numerous vehicles driving on a road. The vehicles include a tracking vehicle 102, a target vehicle 104, a target vehicle 106, and a target vehicle 108. The tracking vehicle 102 is an autonomous vehicle operating at a particular autonomy level. The tracking vehicle 102 can track the target vehicles 104, 106, and 108 in order to navigate the environment. For example, the tracking vehicle 102 can determine the position and size of the target vehicle 104 to determine when to slow down, speed up, change lanes, and/or perform some other function. While the vehicle 102 is referred to as a tracking vehicle 102 and the vehicles 104, 106, and 108 are referred to as target vehicles with respect to FIG. 1, the vehicles 104, 106, and 108 can also be referred to as tracking vehicles if and when they are tracking other vehicles, in which the other vehicles become target vehicles.

While some autonomous vehicles may be able to determine a classification or category of another vehicle (e.g., based on object detection and classification), the three-dimensional (3D) sizes of vehicles can have large variance even within the same classification or category. For example, a vehicle category of "truck" can include many different shapes and sizes of trucks, including small trucks, medium-sized trucks, and large trucks. Indeed, some trucks, such as semi-trailer trucks and moving trucks, are multiple times larger than small trucks. Accurately estimating the 3D size, including the length, of other vehicles on the road is an important feature of an autonomous driving system of an autonomous vehicle to be able make accurate motion planning and trajectory planning decisions.

Other types of systems can also benefit from accurately determining a size and/or position of target objects. For instance, robotics systems that perform operations on objects may need to be able to accurately estimate the 3D size of the objects. In one illustrative example, a robotics device used for manufacturing a device needs to know the size, dimensions, and position of the device and its components in order to build the device. In another illustrative example, an aviation system (e.g., unmanned aerial vehicles among others) can benefit from the accurate determining of objects in a flight path so that the aviation system can accurately navigate around the objects. Many other examples exist of systems that need to be able to identify the size and position of objects.

Systems, apparatuses, methods (also referred to as processes), and computer-readable media (collectively referred to as "systems and techniques") are described herein for determining the size and position of objects using various types of information, such as camera information, map information, radar information, and/or other information. A system can be included in and the techniques can be performed by an object (referred to as a tracking object) tracking one or more other objects (referred to as target objects). In some examples, a map-based inverse perspective mapping (IPM) technique can be performed by a tracking object to determine an estimated three-dimensional (3D) position and/or orientation, as well as an estimated size of a target object detected in an image or in multiple images. The image(s) can be captured by one or more cameras located in or on the tracking object. The map-based IPM technique can use a point map. The point map can include a plurality of map points corresponding to one or more reference locations in a 3D space. A subset of the plurality of map points from the point map can be projected onto the image in which the target object is detected. A bounding region (e.g., bounding box, bounding ellipse, or other bounding region) corresponding to the detected target object can be associated with a map point from the subset of projected map points using a map-based location association function. Once the map point on the map is associated with the bounding region of the detected target object, the bounding region and the map point can be used to determine the estimated 3D position (and/or orientation) and the estimated size of the target object. For example, given a width of the object (e.g., based on a given classification or category of the object) and an orientation of the target object, a length and height of the target object can be determined along with a location of a corner of a 3D bounding box representing the target object. The location of the corner of the 3D bounding box provides the 3D position of the target object. The map-based IPM technique can be performed on a single image or on multiple images in which the target object is detected.

In some examples, for a given target object detected in one or more images, likelihood estimation can be performed by a tracking object to track the likelihood that the target object includes various classifications (also referred to herein as classes). For example, a likelihood filter can be used to track the likelihood of the various classes by combining the information from class labels provided by detections from one or more multiple cameras over a tracking history for the target object. For instance, given an input image, an object detection technique can be performed to detect the target object and to provide a class (or multiple classes in some cases) for the target object. Multiple images of the object can be processed using object detection, resulting in the possibility of multiple classes being determined for the target object. A weight can be provided to each class of the various classes determined for the target object. In some cases, the weight can be based on a distance between the target object and the tracking object including the one or more cameras used to capture the one or more images. In some cases, the weight for a particular class can also be based on a confidence score output by object detection. The confidence score indicates a confidence (e.g., a probability) that the target object is of the given class. The best estimate of the class (from the multiple classes) for the detected target object is determined as the class with the highest likelihood accumulated over the history of detections of the target object. The object class estimated by the likelihood estimation can be used to define upper and lower limits to the size (e.g., the length, width, and/or height) of the target object. The upper and lower limits can be used when estimating the size of the target object.

In some examples, radar information can be used by a tracking object to estimate a size of a target object. For example, at periodic time instances, radar signals that reflect off of the target object can be obtained in a most recent radar frame from multiple radar sensors positioned on the tracking object. Radar measurements of the radar signals from the multiple radar sensors can be jointly processed, and a maximum longitudinal spread of radar measurement points along the direction of orientation of the target object can be used to determine an instantaneous estimate of the size (e.g., length or other size or dimension) of the target object. In some implementations, the best estimate of the size (e.g., length) from the radar-based size estimation is determined as a given largest instantaneous estimate out of a certain number of size estimates.

The radar-based size estimation can be used individually or in combination with the map-based size estimation and/or the likelihood estimation to determine a size of the object. For example, in some cases, an estimation model can take into account the map-based size estimation, the radar-based size estimation, and/or the likelihood estimation to determine a final estimated size for a target object. In some implementations, the estimation model can include an estimation framework (e.g., a Bayesian estimation framework or other estimation model framework) that acts as a Kalman filter.

Figure 2:
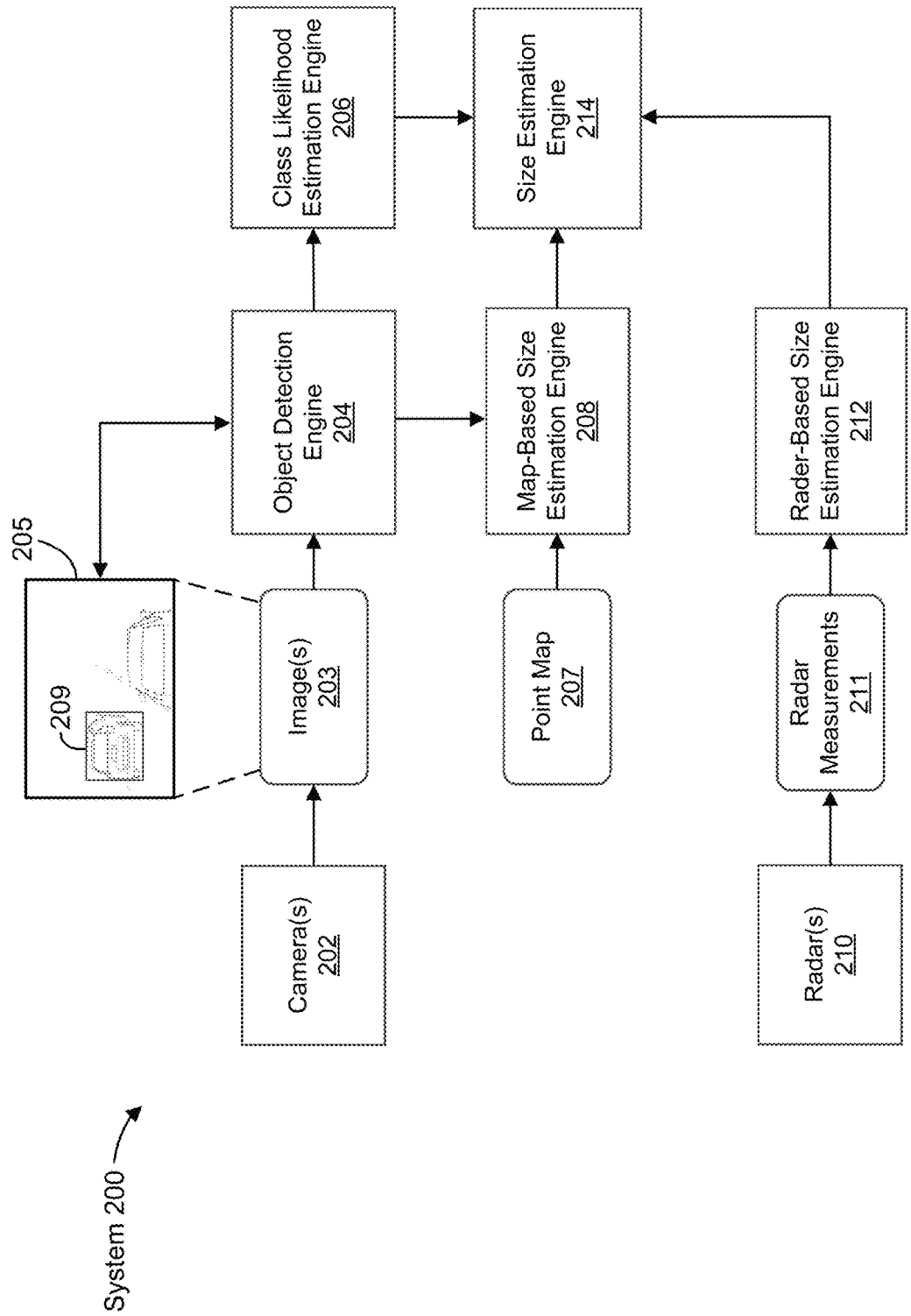
FIG. 2 is a block diagram illustrating an example of system for determining sizes, positions, and orientations of objects, in accordance with some examples.

FIG. 2 is a block diagram illustrating an example of a system 200 for determining the sizes and/or positions of objects in an environment. The system 200 can be included in a tracking object that tracks one or more target objects. As noted above, a tracking object refers to an object that tracks one or more other objects, which are referred to as target objects. In one illustrative example, the system 200 can include an autonomous driving system included in an autonomous vehicle (as an example of a tracking object). In another illustrative example, the system 200 can include an autonomous navigation system included in a robotics device or system. While examples are described herein using autonomous driving systems and autonomous vehicles for illustrative purposes, one of ordinary skill will appreciate the system 200 and related techniques described herein can be included in and performed by any other system or device for determining the sizes and/or positions of objects.

The system 200 can be used to estimate the sizes of objects in an environment using two-dimensional (2D) bounding region detections and corresponding object type classifications from camera-based object detection, using point detections from radars, using radar images, a combination thereof, and/or using other information. In some cases, in addition to or as an alternative to using the 2D bounding region detections, type classifications, and/or radar point detections, the system 200 can estimate the sizes of objects in the environment using object detections from imaging radars. In one illustrative example, the system 200 can estimate the sizes of target vehicles detected on a road using 2D bounding box detections and corresponding vehicle type classifications from cameras, point detections from radars, and, optionally, object detections from imaging radars. As described in more detail below, the system 200 can apply any combination of one or more of a camera-based object-type likelihood filter, a camera-map fusion technique for object (e.g., vehicle or other object) dimension estimation, a radar-based length estimation technique, and/or imaging radar-based object detections, and can implement an estimation model to track the best estimate of the size (e.g., length and/or other size dimension) of an object using measurements provided by map-based size determination, the radar-based size estimation, and/or the imaging radar detections.

The system 200 includes various components, including one or more cameras 202, an object detection engine 204, a classification (class) likelihood estimation engine 206, a map-based size estimation engine 208, one or more radars 210, a radar-based size estimation engine 212, and a size estimation engine 214. The components of the system 200 can include software, hardware, or both. For example, in some implementations, the components of the system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the system 200.

While the system 200 is shown to include certain components, one of ordinary skill will appreciate that the system 200 can include more or fewer components than those shown in FIG. 2. For example, the system 200 can include, or can be part of a computing device or object that includes, one or more input devices and one or more output devices (not shown). In some implementations, the system 200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

As noted above, the system 200 can be implemented by and/or included in a computing device or other object. In some cases, multiple computing devices can be used to implement the system 200. For example, a computing device used to implement the system 200 can include a computer or multiple computers that are part of a device or object, such as a vehicle, a robotic device, a surveillance system, and/or any other computing device or object with the resource capabilities to perform the techniques described herein. In some implementations, the system 200 can be integrated with (e.g., integrated into the software, added as one or more plug-ins, included as one or more library functions, or otherwise integrated with) one or more software applications, such as an autonomous driving or navigation software application or suite of software applications. The one or more software applications can be installed on the computing device or object implementing the system 200.

The one or more cameras 202 of the system 200 can capture one or more images 203. In some cases, the one or more cameras 202 can include multiple cameras. For example, an autonomous vehicle including the system 200 can have a camera or multiple cameras on the front of the vehicle, a camera or multiple cameras on the back of the vehicle, a camera or multiple cameras on each side of the vehicle, and/or other cameras. In another example, a robotic device including the system 200 can include multiple cameras on various parts of the robotics device. In another example, aviation device including the system 200 can include multiple cameras on different parts of the aviation device.

The one or more images 203 can include still images or video frames. The one or more images 203 each contain images of a scene. An example of an image 205 is shown in FIG. 2. The image 205 illustrates an example of an image captured by a camera of a tracking vehicle, including multiple target vehicles. When video frames are captured, the video frames can be part of one or more video sequences. In some cases, the images captured by the one or more cameras 202 can be stored in a storage device (not shown), and the one or more images 203 can be retrieved or otherwise obtained from the storage device. The one or more images 203 can be raster images composed of pixels (or voxels) optionally with a depth map, vector images composed of vectors or polygons, or a combination thereof. The images 203 may include one or more two-dimensional representations of a scene along one or more planes (e.g., a plane in a horizontal or x-direction and a plane in a vertical or y-direction), or one or more three dimensional representations of the scene.

The object detection engine 204 can obtain and process the one or more images 203 to detect and/or track one or more objects in the one or more images 203. The object detection engine 204 can output objects as detected and tracked objects. The object detection engine 204 can determine a classification (referred to as a class) or category of each object detected in an image, and can also generate a bounding region for identifying each object in the image (e.g., bounding region 209 identifying a target vehicle in the image 205). For instance, an object can be detected in an image, and a bounding region and class label (also referred to as a category label) can be output by the object detection engine 204 for the detected object. The bounding region can be used by other components of the system 200 to identify a region of the image that includes the detected object. In some cases, the dimensions of a bounding region (e.g., the width and/or height, the length of a diagonal, such as from a bottom-left corner to a top-right corner of from a top-left corner to a top-right corner, or other dimensions) can also be output by the object detection engine 204. A bounding region assigned to a detected object can include a bounding box, a bounding circle, a bounding ellipse, or any other suitably-shaped region representing a detected object. While examples are described herein using bounding boxes for illustrative purposes, the techniques and systems described herein can also apply using other suitably shaped bounding regions. A bounding box associated with a detected object can have a rectangular shape, a square shape, or other suitable shape. In some cases, the object detection engine 204 can output multiple classes for a detected object, along with a confidence score indicating a confidence that the object belongs to each of the classes (e.g., a confidence score of 0.85 that the object is a car, a confidence score of 0.14 that the object is a truck, and a confidence score of 0.01 that the object is a motorcycle).

Any suitable object detection and/or classification technique can be performed by the object detection engine 204. In some cases, the object detection engine 204 can use a machine learning based object detector, such as using one or more neural networks. For instance, a deep learning-based object detector can be used to detect and classify objects in the one or more images 203. In one illustrative example, a Cifar-10 neural network based detector can be used to perform object classification to classify objects. In some cases, the Cifar-10 detector can be trained to classify only certain objects, such as vehicles only. Further details of the Cifar-10 detector are described below with respect to FIG. 15.

Figure 16C:
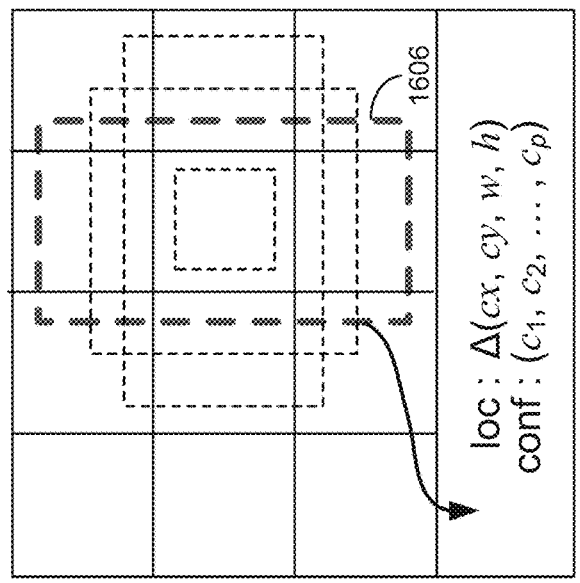
FIG. 16A-FIG. 16C are diagrams illustrating an example of a single-shot object detector, in accordance with some examples.

Another illustrative example of a deep learning based detector is a fast single-shot object detector (SSD) including a neural network and that can be applied for multiple object categories. A feature of the SSD model is the use of multi-scale convolutional bounding box outputs attached to multiple feature maps at the top of the neural network. Such a representation allows the SSD to efficiently model diverse bounding box shapes. It has been demonstrated that, given the same VGG-16 base architecture, SSD compares favorably to its state-of-the-art object detector counterparts in terms of both accuracy and speed. An SSD deep learning detector is described in more detail in K. Simonyan and A. Zisserman, "Very deep convolutional networks for large-scale image recognition," CoRR, abs/1409.1556, 2014, which is hereby incorporated by reference in its entirety for all purposes. Further details of the SSD detector are described below with respect to FIG. 16A-FIG. 16C.

Another illustrative example of a deep learning-based detector that can be used to detect and classify objects in the one or more images 203 includes the You only look once (YOLO) detector. The YOLO detector, when run on a Titan X, processes images at 40-90 fps with a mAP of 78.6% (based on VOC 2007). A YOLO deep learning detector is described in more detail in J. Redmon, S. Divvala, R. Girshick, and A. Farhadi, "You only look once: Unified, real-time object detection," arXiv preprint arXiv: 1506.02640, 2015, which is hereby incorporated by reference in its entirety for all purposes. Further details of the YOLO detector are described below with respect to FIG. 17A-FIG. 17C. While the Cifar-10, SSD, and YOLO detectors are provided as illustrative examples of deep learning-based object detectors, one of ordinary skill will appreciate that any other suitable object detection and classification can be performed by the object detection engine 204.

For a given image from which one or more target objects are detected, the class likelihood estimation engine 206 can obtain the bounding regions and the class or classes determined for the one or more target objects. For example, for a target object detected in an image, the class likelihood estimation engine 206 can obtain the bounding region and the class (or classes) determined for the target object by the object detection engine 204. The class likelihood estimation engine 206 can use the class(es) and bounding region for each target object to determine a likelihood that the target object is of a particular class of object. In some cases, the class likelihood estimation engine 206 can include a likelihood filter. The likelihood filter can be used to track the likelihood that a particular target object includes various classes by combining the information from various class labels output by the object detection engine 204 for the particular target object based on the processing of images provided from the one or more cameras 202 over a tracking history for the particular target object. For example, multiple images of the target object from one or multiple cameras can be processed and the target object can be detected in each of the multiple images. The tracking history for a target object can include the detections of that target object in all images since the first detection of that object in an image. A class is determined for each detection of the target object in each image, resulting in the possibility that multiple classes can be determined for the target object across the multiple images. The multiple classes can be processed by the likelihood filter to determine a likelihood that the target object is of a particular class of object. Based on the likelihood, the class likelihood estimation engine 206 can determine a most likely class for the target object.

The class likelihood estimation engine 206 can determine a weight for each class of the various classes determined for the target object across the multiple images. A higher weightage is determined for classes associated with object detection results that are considered to be more certain. The certainty of an object detection result and the associated class resulting from that object detection result can be based on a distance between the target object and the tracking object including the system 200, in which case the weight assigned to that class can be based on the distance. In some cases, the distance used to determine the weight for a class can be based on the distance between the target object detected in an image and the camera on the tracking object used to capture that image. In some cases, the weight for a class can also be based on a confidence score output by the object detection, which indicates a confidence (e.g., a probability) that the target object is of the given class.

In one illustrative example, for each class c, a term $cw_c$ denotes the cumulative weight of all observed classes that have been received for a given tracked object. Every time a new detection y of class c is received by the class likelihood estimation engine 206, the cumulative weight $cw_c$ of the class c can be updated to include the weight $w_y$ assigned to the new detection. In one example, the following formulation can be used to update the cumulative weight $cw_c$ for the class c:

$$cw_c = cw_c + w_y \quad \text{Equation (1),}$$

where $w_y$ can be determined as follows:

$$w_y = \frac{A}{B + \|x_{target} - x_{tracking}\|}. \quad \text{Equation (2)}$$

In Equation (2), the terms A and B are positive constants, $x_{target}$ is the estimated position of the target object at the time of the detection, and $x_{tracking}$ is the estimated position of the tracking object (or the estimated position of the camera, on the tracking object, that was used to capture the image of the target object) at the time of the detection. The positive constants A and B can be set to any suitable values. In one illustrative example, A is equal to 50 meters (m) and B is equal to 5 m, assuming position is represented in meters. Using vehicles as an illustrative example, when a tracking vehicle (sometimes referred to as an ego vehicle) is tracking a target vehicle, $x_{target}$ is the estimated position of the target vehicle at the time of detection of the target vehicle in an image, and $x_{tracking}$ is the estimated position of the tracking (ego) vehicle (or the estimated position of a camera used to capture the image of the target vehicle) at the time of the detection of the target vehicle in the image. As can be seen by Equation (2), the larger the distance between the target object and the tracking object (or camera thereof) for a given detection of the target object, the larger the weight $w_y$ is for the class determined by that detection of the target object. As illustrated by equation (1), the weight $w_y$ assigned to a class c determined by a given detection of the target object is added to the cumulative weight $cw_c$ for that class c. Each different class determined for the target object can be updated using equations (1) and (2), or using another suitable technique.

The likelihood of a class c can be determined as the following ratio:

$$L_c = \frac{cw_c}{\sum_i cw_i}, \quad \text{Equation (3)}$$

where $cw_i$ represents cumulative weights for different classes i across all detections of the target object being analyzed. In one illustrative example, a cumulative weight $cw_1$ can be maintained for a first class (e.g., a "car" class), a cumulative weight $cw_2$ can be maintained for a second class (e.g., a "truck" class), and a cumulative weight $cw_3$ can be maintained for a third class (e.g., a "motorcycle" class) for which a target object has been classified during its tracking history. In such an example, for a current image in which the target object is detected and classified, the cumulative weight $cw_1$ for a "car" class can have a current value of 70, the cumulative weight $cw_2$ for a "truck" class can have a current value of 25, and the cumulative weight $cw_3$ for a "motorcycle" class can have a current value of 5. Using such example values and Equation (3), the likelihood that the target object is a "car" is determined as $$\frac{70}{70 + 25 + 5}$$

(corresponding to a value of 0.7). Similarly, the likelihood $L_c$ that the target object is a "truck" is determined as $$\frac{25}{70 + 25 + 5}$$

(corresponding to a value of 0.25), and the likelihood $L_c$ that the target object is a "motorcycle" is determined as $$\frac{5}{70 + 25 + 5},$$

(corresponding to a value of 0.05).

The best estimate of the class of the target object for a given image or group of images is given by the class with the highest likelihood accumulated over the entire tracking history of detections of the target object. For instance, continuing with the example above, the best estimate of the class of the vehicle can be the "car" class, due to the "car" class having the highest likelihood over the target vehicle's tracking history out of the "car," "truck," and "motorcycle" classes. The object class estimated by the class likelihood estimation engine 206 can be used to define upper and lower limits to the size (e.g., the length, width, and/or height) of the target object. For example, the upper and lower limits for the length of a "car" class can be based on the smallest length and the largest length, respectively, of all known cars. As described in more detail below, the upper and lower limits can be used by the size estimation engine 214 when estimating the size of a target object.

The map-based size estimation engine 208 can perform a camera-map fusion for determining an estimated three-dimensional (3D) position (and/or orientation) and an estimated a size (e.g., one or more dimensions) of a target object detected in an image. A point map 207 and a bounding box (or other bounding region) output from the object detection engine 204 can be used by the map-based size estimation engine 208 to determine the estimated 3D position and size of the target object associated with the bounding box. In one example using autonomous vehicles for illustrative purposes, the object detection engine 204 can output to the map-based size estimation engine 208 a 2D axis-aligned bounding box in the image, where the bounding box borders the vehicle detected in the image. An example of a 2D axis-aligned bounding box 209 is shown bordering a vehicle in the image 205 of FIG. 2. Axis-aligned means that the edges of the bounding box are parallel to the edges of the image (e.g., as shown in FIG. 5B by the edges of the bounding box 550 being parallel the edges of the image 510). In some cases, the object detection engine 204 can also output the class of the vehicle that was detected (e.g., a "car," "truck," "motorcycle," etc.).

Because the 2D bounding boxes from object detection are projections of the vehicle, the bounding boxes do not provide a direct measurement of the 3D dimensions of the object. The map-based size estimation engine 208 can perform a map-based inverse perspective mapping (IPM) technique to determine an estimated 3D position (and/or orientation) and an estimated size of the target object detected in the image. For instance, the map-based IPM technique can be used to determine a 6-degrees of freedom (6-DoF) pose of the target object, which includes a 3D position and a 3D orientation. For instance, the 6-DoF pose can include a 3D rotational vector (including angles for pitch along the transverse axis, roll along the longitudinal axis, and yaw along the normal axis) and a 3D translational vector (including translation in the horizontal (x) direction, vertical (y) direction, and depth (z) direction)). The pitch, roll, and yaw relative to a camera can be conceptualized as the yaw being the camera's horizontal rotation relative to the ground (e.g., left-to-right relative to the horizontal axis), the pitch being the camera's vertical rotation relative to the ground (e.g., up and down relative to the horizontal axis), and the roll being the camera's side-to-side rotation relative to the horizon (e.g., side-to-side relative to the horizontal axis). The 3D orientation can be determined from a map-based location association using the point map 207, and the 3D position can be determined using the map-based IPM technique described below. The map-based IPM technique can combine information from the point map 207 with the 2D bounding boxes to obtain a 3D position (and/or orientation) and size estimate of the detected vehicle. The target object can be modeled as a cuboid or a 3D orientated bounding box. The position in the real-world (or pose) of the camera used to capture the image of the target object is also known. In some cases, using the point map 207, the 2D bounding box of a detected target object, and the position of the camera in the real-world, an estimate of the position of the 3D bounding box representing the object and the size of the object can be determined.

The point map 207 can include a plurality of map points corresponding to one or more reference locations in a 3D space. The point map 207 can be referred to in some cases as a high-definition (HD) map. In one example using autonomous vehicles as an illustrative example of objects, the points of the point map 207 define stationary physical reference locations related to roadways, such as road lanes and/or other data. For example, the point map 207 can represent lanes on the road as a connected set of points. Line segments are defined between two map points, where multiple line segments define the different lines of the lanes (e.g., boundary lines and center lines of a lane). The line segments can make up a piece-wise linear curve defined using the map points. For example, the connected set of points (or segments) can represent the center lines and the boundary lines of a lane on a road, which allow an autonomous vehicle to determine where it is located on the road and where target objects are located on the road. In some cases, different point maps can be maintained for different areas of the world (e.g., a point map for New York City, a point map for San Francisco, a point map for New Orleans, and so on). In some examples, the different point maps can be included in separate data files (e.g., Geo-JavaScript Object Notation (GeoJSON) files, ShapeFiles, comma-separated values (CSV) files, and/or other files).

The map-based size estimation engine 208 can perform a map-based location association function to associate bounding boxes (or other type of bounding regions) of detected objects to map points (also referred to as map waypoints) of the point map 207. For instance, the map-based size estimation engine 208 can project a subset of the plurality of map points from the point map 207 onto the image from which the target object was detected. The bounding box of the detected target object can be associated with a map point from the subset of projected map points using the map-based location association function. Details describing the map-based location association function using vehicles as an illustrative example are provided below. Once the bounding box of the detected target object is associated with a particular map point, the bounding box, the map point, and the known orientation of the lane associated with the map point can be used to determine the estimated 3D position and/or orientation (e.g., the 6-DoF pose) and the estimated size of the target object. For example, given a width of the object (e.g., based on a given classification or category of the object) and an orientation of the target object (e.g., based on the lane orientation), a length and height of the target object can be determined along with a location of a corner of the 3D bounding box representing the target object.

As noted previously, for autonomous vehicles, the point map 207 can include a plurality of points representing lanes (as an example of "reference locations") on roads in the real world, where line segments are defined between two map points. The map-based size estimation engine 208 of the system 200 implemented by a tracking vehicle can detect and track a target vehicle around the tracking vehicle using the point map 207. A camera of the one or more cameras 202 included in tracking vehicle can capture an image of the target vehicle, and the target vehicle can be detected in the captured image using the object detection engine 204. The map-based size estimation engine 208 can project a subset of the points from the point map 207 that are within the field of view of the camera to the camera image. The map-based size estimation engine 208 can then apply the map-based location association function to associate a point from the subset of points with the bounding box identifying the detected target vehicle in the image. When performed for autonomous driving, the map-based location association function can be referred to as map-based lane vehicle association (Map LVA), which can be used to associate each 2D bounding box for a detected target vehicle with a point from the subset of points from the point map 207 that are projected to the image.

The map-based lane vehicle association (e.g., Map LVA) can help to clean out detections from other lanes and can help an association engine (not shown) to prevent cross association. The association engine is responsible for assigning (or associating) a new set of detections to an existing set of tracks. For instance, as described below, the association engine can be used to associate camera-based object detections from the object detection engine 204 to estimations from other components of the system 200 (e.g., the radar-based size estimation engine 212 and/or the radar-based size estimations engine 212). A track can be maintained for each target object (e.g., each target vehicle or other object). For example, in a multiple target tracking scenario, a separate estimate (or track) can be maintained for each target object. In some cases, one or more observations are not associated with an existing track (referred to as a no-association event), in which case the one or more observations can be associated with new tracks. Such a no-association event can happen, for example, if a new target object (e.g., target vehicle) enters the scene being captured by a tracking object (e.g., tracking vehicle). Cross-association is one of the failure events of the association engine, where, an observation emanating from vehicle A is wrongly associated to tracked vehicle B. Cleaning up detections/observations can help prevent cross-associations. In one illustrative example, the cleaning can be done by letting the association engine not consider the detections that were associated (by the map-based location association function, such as Map LVA) to a different lane than the lane containing the tracked vehicle. In some examples, the association engine can ignore detections coming from outside of the point map 207 (e.g., coming from guardrails, lane barriers, and/or other location other than locations in the point map 207). For instance, the association engine can prune out (or remove) detections for which map-based lane vehicle association (e.g., Map LVA) has failed. The pruned-out or removed detections may not be considered in subsequent processes performed by the system 200 (e.g., by the map-based size estimation engine 208, the size estimation engine 214, etc.).

The association performed by the association engine can be performed using any suitable technique, such as using a form of weighted bipartite graph matching. In one example, detections from a single imaging radar frame can be associated to the tracks that are currently maintained by a tracking object (e.g., a tracking vehicle or other object). For instance, a bipartite graph can include tracks forming the nodes on one part of the bipartite graph and detections from one sensor frame in the other part of the bipartite graph. Each track node can be connected to each detection node by an edge, and a weight can be assigned to each edge, where the weight is proportional to the degree of disagreement between the current estimate of the track and the detections. In one illustrative example, in the case of an imaging radar frame, the weight can be proportional to the squared distance between the current estimate of the mean position of the track and the position of a detected object (e.g., a detected target vehicle). The best association of detections to tracks is given by the minimum weight matching on the weighted bipartite graph.

Figure 3:
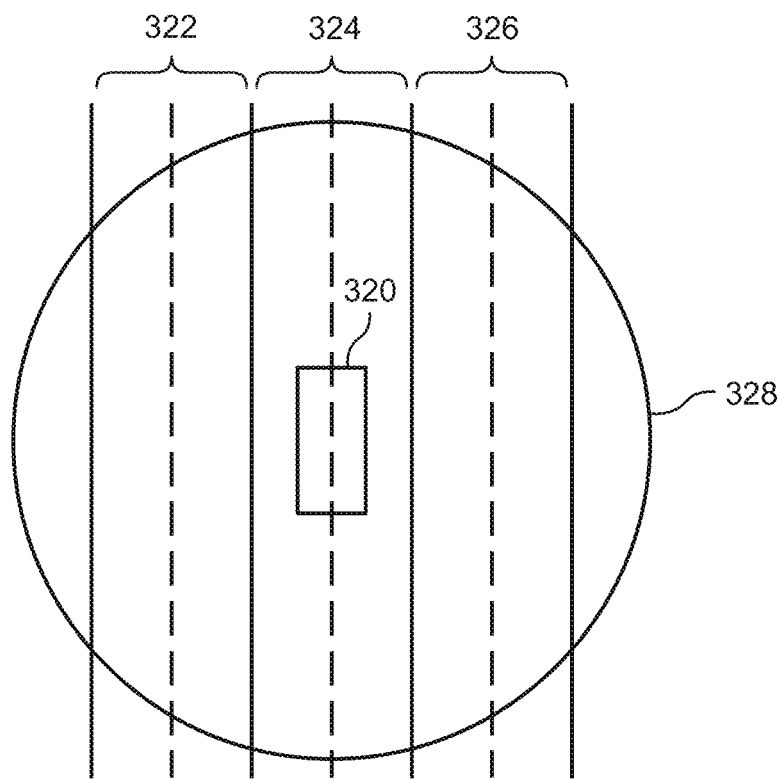
FIG. 3 is a diagram illustrating an example of determining a subset of points from a map of points corresponding to reference locations in an environment, in accordance with some examples.

As described above, the map-based size estimation engine 208 can project a subset of the points from the point map 207 to the captured image. In some examples, the subset of points from the point map 207 can include all map points that are within the camera's field of view and that are within a selection range from the camera (e.g., within 50 meters, 75 meters, 100 meters, 150 meters, or other distance). The selection range can be referred to herein as a point subset selection range. FIG. 3 is a diagram illustrating an example of determining a subset of points from a map of points corresponding to reference locations in an environment. The example in FIG. 3 shows three lanes of a highway from a top perspective view (or "birds eye view"), including a left lane 322, a middle lane 324, and a right lane 326. Each lane is shown with a center line and two boundary lines, with the middle lane 324 sharing a boundary line with the left lane 322 and the right lane 326. A vehicle 320 is shown in the middle lane 324. One or more cameras on the vehicle can capture images of the environment surrounding the vehicle, as described herein. A point subset selection range 328 is shown in FIG. 3, which illustrates a range relative to a camera from which a subset of points can be selected from the point map 207 for projection onto an image captured by the camera. As noted above, the point map 207 can include points (or waypoints) representing the lines of the lanes. For example, each line can be defined by a number of points. All points defining the center lines and boundary lines of the lanes 322, 324, and 326 that are within the point subset selection range 328 can be selected for projection onto an image captured by a camera on the vehicle 320. In some implementations, the range can be adjusted to meet different needs based on the given application (e.g., autonomous driving, robotics, video analytics, or other application).

Figure 4:
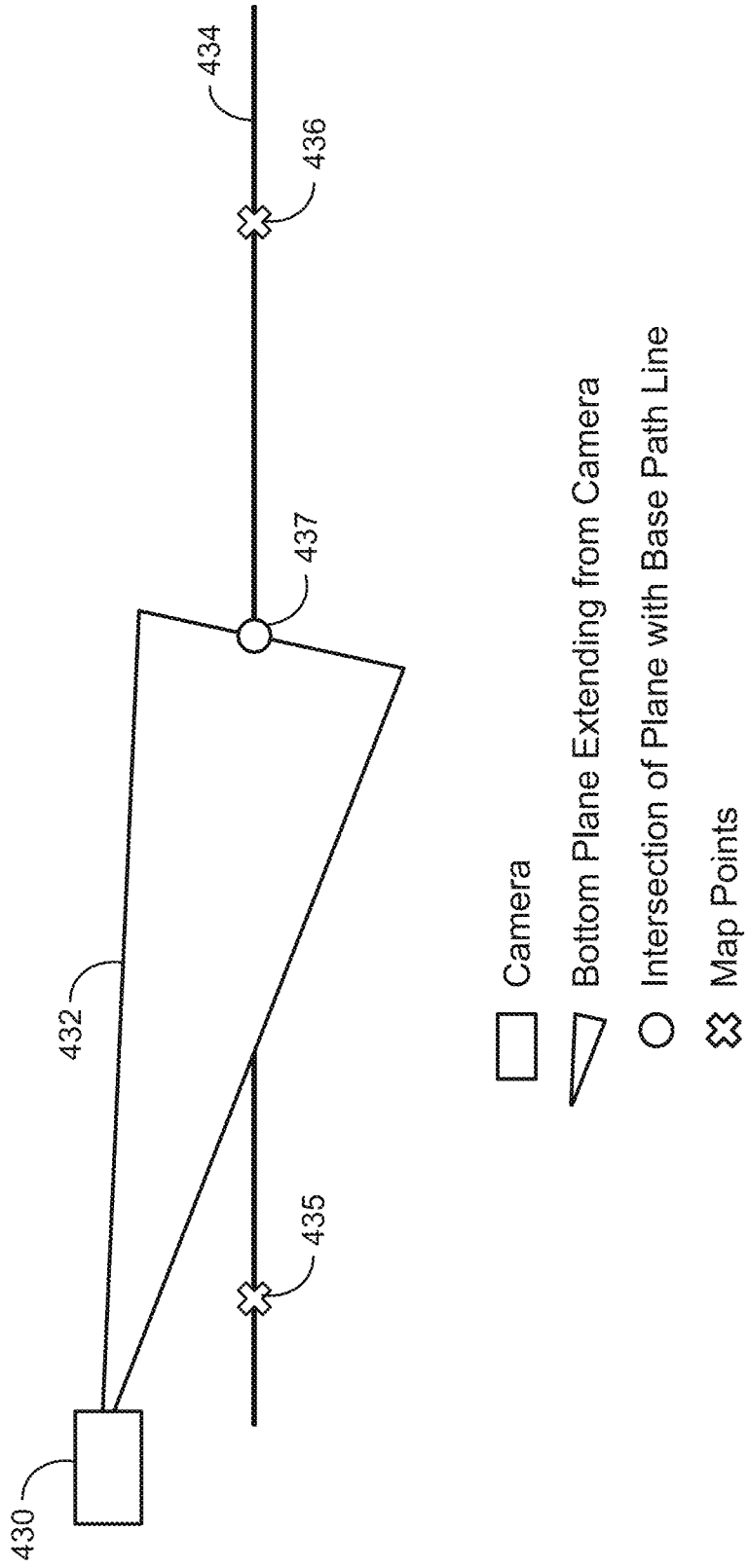
FIG. 4 is a diagram illustrating an example of projecting a subset of map points from a map of points to an image plane of an image, in accordance with some examples.

FIG. 4 is a diagram illustrating an example of projecting a subset of map points from a map of points to an image plane of an image captured by a camera 430. The camera 430 can be part of a vehicle or other device or object. The point map 207 has a direction associated with it, where the points in the point map 207 are arranged in a sequence. In some cases, the sequence is in the same direction as the direction in which the tracking object (e.g., a tracking vehicle or other object) is moving. For a given point in the sequence of the point map 207 that is currently being observed or processed (referred to as a "current map point"), a subsequent point as ordered in the sequence of points is referred to as a "next map point" in the point map 207. Referring to FIG. 4, a base path line 434 is shown with a current map point 435 and a next map point 436. The base path line 434 is a center line of a particular lane on a road. To perform the mapping, the map-based size estimation engine 208 can check if the current map point 435 and the next map point 436 are within the image after the projection of the points from the point map 207 are projected onto the image. If not, the map-based size estimation engine 208 can use the field of view (or view frustum) of the camera to see where the bottom plane 432 (of the field of view of the camera) extending from the camera intersects with the base path line 434 and uses the intersection point (illustrated as intersection point 437) as the point on image.

Figure 5A:
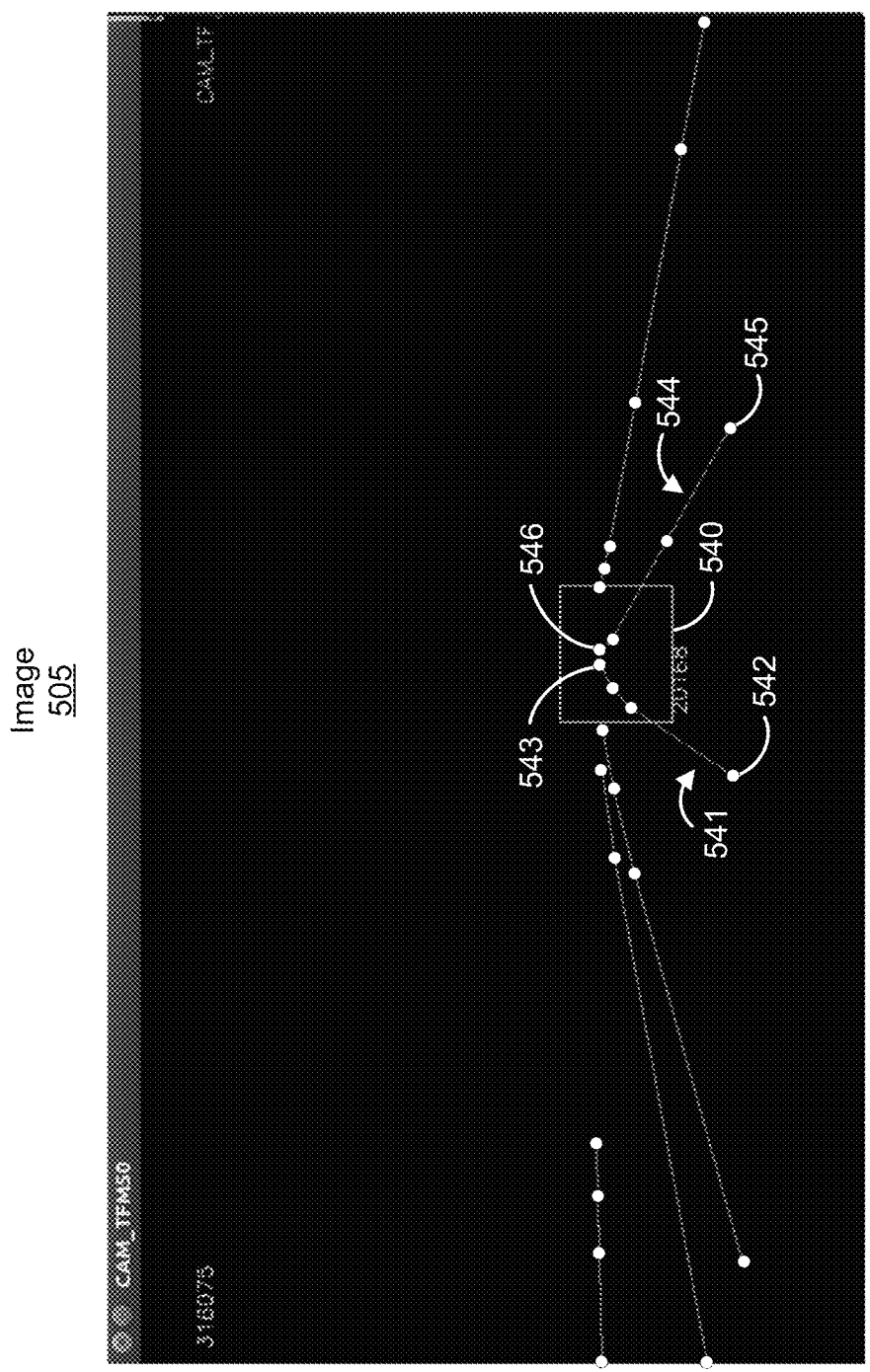
FIG. 5A is a diagram illustrating an example of an image representing an image plane from a front-facing camera of a tracking object, in accordance with some examples.
Figure 5B:
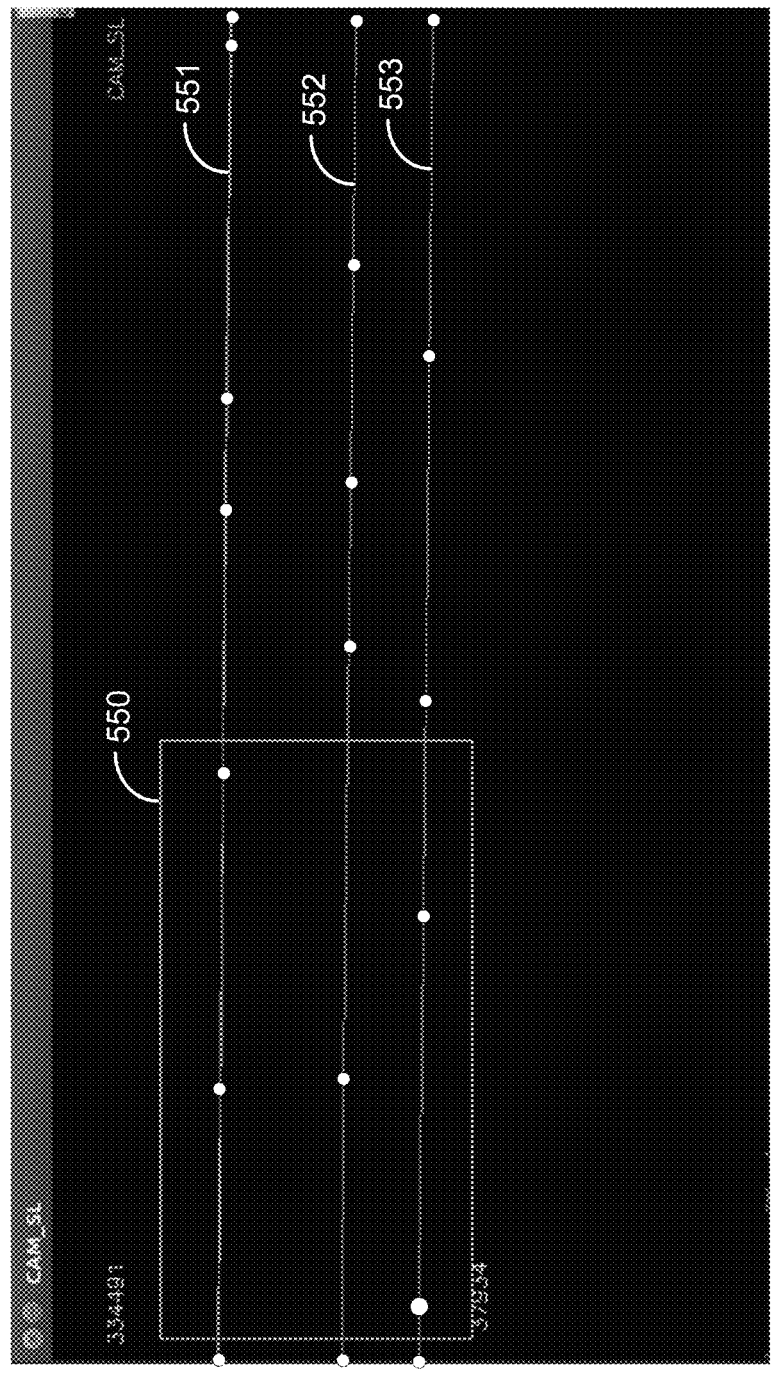
FIG. 5B is a diagram illustrating an example of an image representing an image plane from a side-facing camera of a tracking object, in accordance with some examples.

FIG. 5A is a diagram illustrating an example of an image 505 representing an image plane from a front-facing camera of a tracking object. The image 505 shown in FIG. 5A is captured by a front-facing camera of a tracking vehicle. Multiple center lines of lanes on a road are shown, including a lane center line 541 and a lane center line 544, among others. Map points (which define the lane center lines) that are projected onto the image 505 are shown as white dots. The map points of the lane center lines that are projected onto the image 505 can include all map points of lane center lines that are within the field of view of the front-facing camera and that are within the point subset selection range, as described above. For example, map point 542, map point 543, and other map points between map points 542 and 543 define the lane center line 541. Similarly, map point 545, map point 546, and other map points between map points 545 and 546 define the lane center line 544. A bounding box 540 of a detected target object is shown to include certain map points along the lane center line 541 and along the lane center line 544.

FIG. 5B is a diagram illustrating an example of an image 510 representing an image plane from a side-facing camera of a tracking object. The image 510 is captured by a side-facing camera of a tracking vehicle. Similar to FIG. 5A, center lines of lanes on a road are shown in FIG. 5B, including a lane center line 551, a lane center line 552, and a lane center line 553. Map points defining the lane center lines and that are projected onto the image 510 are shown as white dots. The map points that are projected onto the image 510 include map points of lane center lines that are within the field of view of the side-facing camera and that are within the point subset selection range. A bounding box 550 of a detected target object is shown to include certain map points along the lane center lines 551, 552, and 553.

The projection of the points onto the image can be performed using the pose of the camera (which is known) and using calibration data. As noted above, the pose of the camera is known. For instance, the pose of the camera can be registered as metadata with every detection (or with a certain subset of detections in some cases) and can be queried from the metadata when needed. The calibration data can include a set of transforms (e.g., represented as matrices, such as 3×4 matrices or matrices having other sizes) that transform a 3D point from one frame of reference to another (e.g., using a pinhole camera model). In some cases, the calibration data can also include intrinsic camera parameters, such as focal length and principal point. The intrinsic camera parameters can be used to compute the pixel location of a given 3D point in the camera coordinate system. The calibration data can be maintained separately outside of the system 200.

The point to image projection using the pose of the camera and the calibration data can be performed using any suitable technique. In one illustrative example, a two-step process can be performed, where a first step includes transformation of a point to a camera frame (corresponding to the camera pose) and a second step includes projection of the point onto the image (in the pixel domain). For instance, given a point to-be-projected point in a world frame, denoted as $P_w$, the point $P_w$ can be transformed to the camera frame using $T_{cw}$ (a 3×4 matrix that transforms points from the world frame to the camera frame): $P_c = T_{cw} * P_w$. To project the transformed point $P_c$ onto the image (the pixel domain), the projected point can be given by $Proj_c = K P_c^n$, where K is intrinsic matrix for the camera, which comes from the calibration data, and $P_c^n$ is $P_c$ in normalized coordinates. For example, the following can be used to define the normalized point $$-P_c^n = \left[\frac{P_{c,x}}{P_{c,z}}, \frac{P_{c,y}}{P_{c,z}}, 1\right],$$

where $P_c = [P_{c,x}, P_{c,y}, P_{c,z}]$ from step 1 above.

Once the map points are projected in the camera image used to detect the target object, a map point can be selected for being associated with the bounding box of the target object. Information can be provided for each association determined by the map-based location association function (e.g., the Map LVA), including a map point (from the point map 207) of a map center line (a center line waypoint) for the association, a distance (e.g., a positive parallel distance, which includes a parallel distance in the direction of a lane orientation (or other location represented in the point map) between a point on the bounding box of the target object and one or more projected points, as described below with respect to FIG. 6) along the direction of the point map 207, and a perpendicular distance from the map center line to the center of the bottom edge of the bounding box of the detected object. The map point before the nearest map point can be used for association, resulting in a positive parallel distance. In some cases, only map points that have a positive distance to a detected object may be selected for association with the bounding box of the detected object. For instance, even if the nearest map point to a point on the bounding box (e.g., a midpoint on the bottom edge of the bounding box) of the detected object has negative parallel distance, it may not selected for the association, and a map point before the nearest map point to the point on the bounding box can be selected for association with the bounding box (resulting in a positive parallel distance). A different set of operations can be performed based on the position of the camera on the tracking object that includes the system 200. For instance, a different set of operations can be performed for front and back cameras on the front and back of the tracking vehicle, as compared to side cameras on the sides of the tracking vehicle. The bounding box generated based on the detection of an object in an image can be used along with the map points projected onto the image. For example, the intersection of the bounding box with a map point or other point on the reference location (e.g., a line of a lane on a road) can be used to select the map point or other point for association with the bounding box of the target object. In another example, the distance from a point on the bounding box to various map points can be used to select a map point for association with the bounding box. Examples are provided below using autonomous driving applications for illustrative purposes.

In one illustrative example, when a target vehicle is detected in an image received by a side-facing camera of an autonomous driving system of an autonomous vehicle, selection of a map point for association with a bounding box of the target vehicle can be based on a distance between a point on the bounding box and various map points of a line on a lane of a road (e.g., map points of a lane center line). For example, the bottom edge of the bounding box can be obtained by the map-based size estimation engine 208. The map-based size estimation engine 208 can calculate the midpoint of the bottom edge, and can compare a distance from the midpoint to map points on one or more lane center lines. For example, the lane center line with the shortest distance (and thus the closest lane center line) to the bottom edge of the bounding box can be determined as the lane associated with the target vehicle (corresponding to the lane in which the vehicle is located). All map points within the bounding box and on the closest center line can be selected as candidate association points. The distance between the midpoint of the bottom edge and the candidate association points can be determined. For example, the parallel (in the direction of the lane orientation) distance between the midpoint and the projected points can be calculated (e.g., as a 2D distance in the image plane). The candidate association points can be filtered out to include only map points having a parallel distance from the midpoint that is greater than 0 (a positive parallel distance), and map points for which the midpoint is in between the current map point and the subsequent map point occurring after the current map point in the direction of movement of the tracking vehicle. In some examples, if multiple candidate association points remain after filtering, the map-based size estimation engine 208 can select the point belonging to a center line that passes in between the top and bottom edges of the bounding box. The selected map point provides the segment of the lane (where a segment is between two map points) where the vehicle is located.

Figure 6:
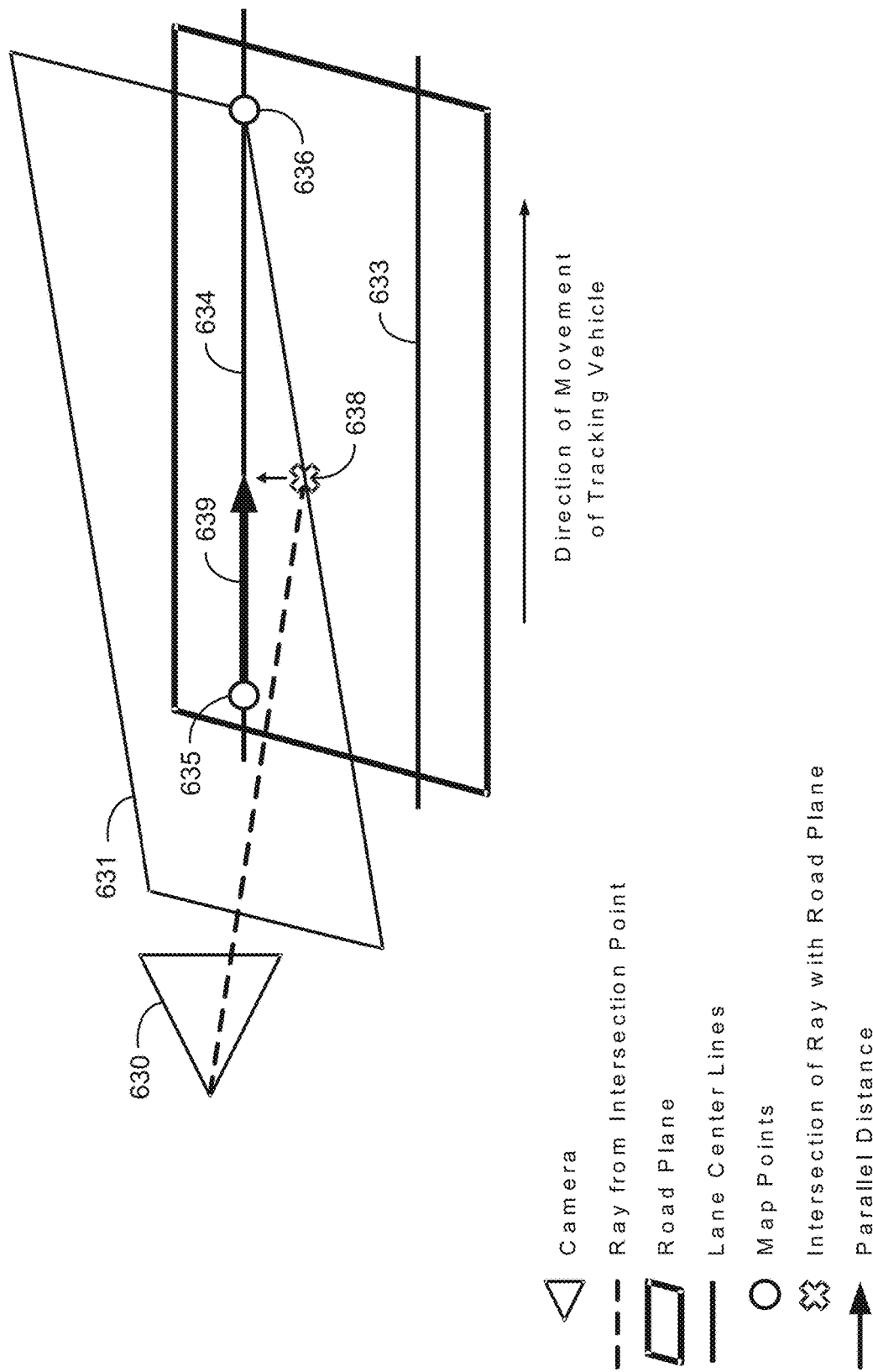
FIG. 6 is a diagram illustrating an example of associating a bounding region of a target object with a point from a subset of map points of a map, in accordance with some examples.

FIG. 6 is a diagram illustrating an example of associating a bounding box 631 of a target object detected in an image with a map point 635 from map points projected onto the image. The example in FIG. 6 illustrates a situation when the image is captured by a side-facing camera 630 of a tracking vehicle. The direction of movement of the tracking vehicle is from left to right in the example of FIG. 6, as illustrated by the arrow. Two lane center lines are shown, including lane center line 633 and lane center line 634. An intersection point 638 (corresponding to a midpoint of the bottom edge of the bounding box 631) of a ray projected from the side-facing camera 630 to the road plane is shown, along with a perpendicular distance between the intersection point 638 and the lane center line 634. The parallel distance 639 between the map point 635 and the intersection point 638 is shown. The map point 635 is selected for association with the bounding box 631 due to the parallel distance 639 being greater than 0 and the intersection point 638 being between the map point 635 and the subsequent map point 636 that occurs after the map point 635 in the direction of movement of the tracking vehicle.

Figure 7:
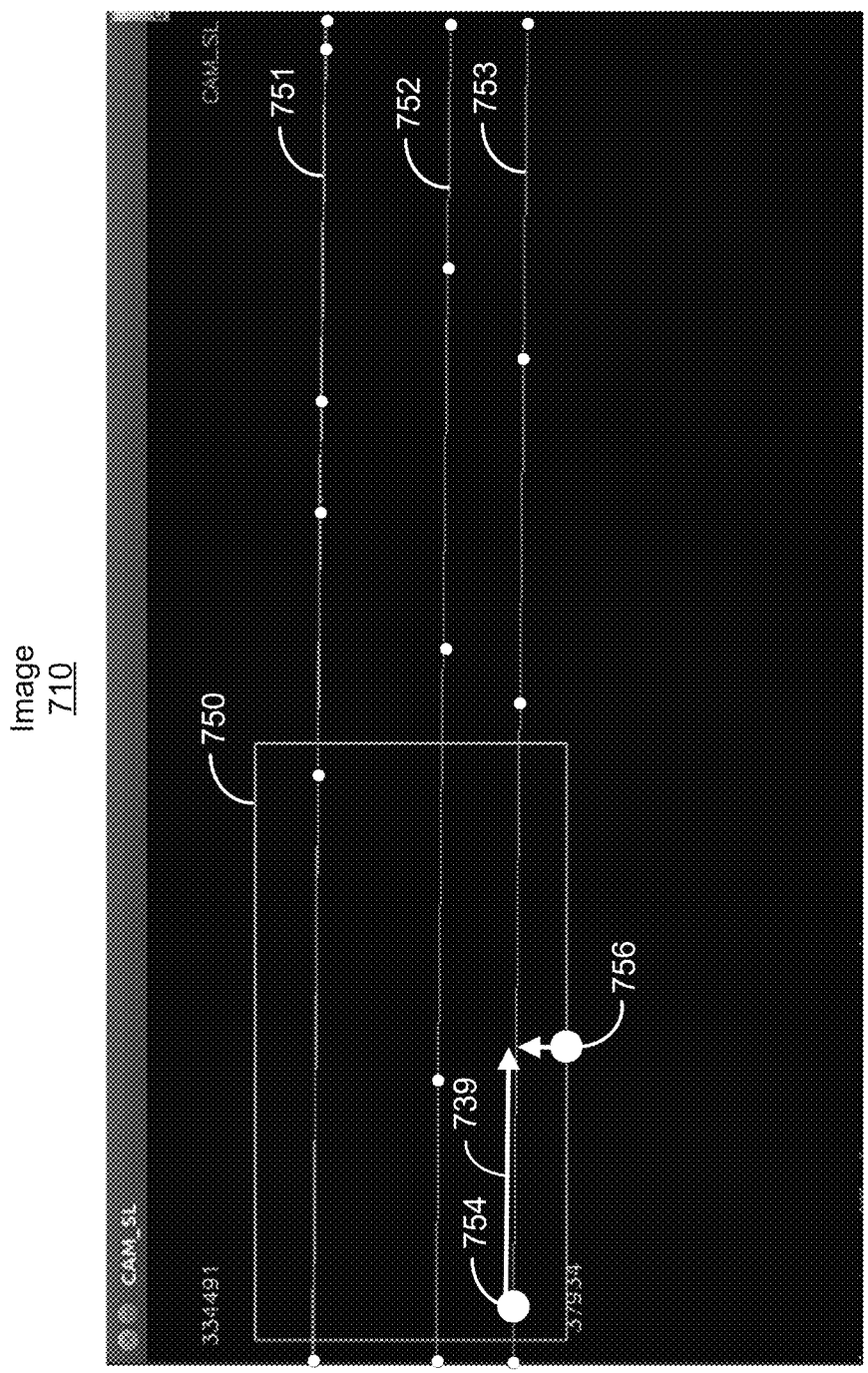
FIG. 7 is an image illustrating an example of associating a bounding region of a target object with a point from a subset of map points of a map, in accordance with some examples.

FIG. 7 is an image 710 illustrating an example of associating a bounding box 750 of a target object detected in an image with a map point 754 from map points projected onto the image 710. The image 710 is captured by a side-facing camera of a tracking vehicle. Center lines of lanes on a road are shown, including a lane center line 751, a lane center line 752, and a lane center line 753. Map points defining the lane center lines and that are projected onto the image 710 are shown as white dots. A bounding box 750 of a detected target object is shown. The map-based size estimation engine 208 can obtain the bottom edge of the bounding box 750, and can determine the midpoint 756 of the bottom edge. The map-based size estimation engine 208 can compare a distance from the midpoint 756 to map points on the lane center lines 751, 752, and 753. The map-based size estimation engine 208 can select the map point 754 as the point that will be associated with the bounding box 750 due to the parallel distance 739 between the map point 754 and the midpoint 756 being greater than 0 and the midpoint 756 being between the map point 754 and the subsequent map point that occurs after the map point 754 in the direction of movement of the tracking vehicle (from left to right in FIG. 7).

In another illustrative example, when a target vehicle is detected in an image captured by a front-facing or back-facing camera of an autonomous driving system, selection of a map point for association with a bounding box of the target vehicle can be based on an intersection of the bounding box with a lane center line. For example, the map-based size estimation engine 208 can obtain the bounding box of the target vehicle and can determine the bottom edge of the bounding box. The map point for the association can be determined by identifying the location where the bottom edge intersects with any lane center line from the points of the point map 207 projected on the image plane. If the above technique fails to identify a point to associate with the bounding box (e.g., the bottom edge does not intersect with a lane center line from the projected points), the bottom edge can be extended so that it intersects with all the lane center lines in the image. The bottom edge of the bounding is chosen as the edge to extend because the bottom edge of a bounding box generated from an image of a front-facing or back-facing will lie on the road surface (due to the bottom of the vehicle being on the road and due to the bounding box bordering or outlining the vehicle). The map-based size estimation engine 208 can then obtain the lane boundary points (the points defining the lane boundaries lines, such as those shown in FIG. 3) associated with the lane center lines. A lane in which the vehicle is positioned can be obtained by determining the two lane boundary points that encompass the midpoint of the bottom edge of the bounding box. The two lane boundary points provide the segment of the lane where the vehicle is located. The point on the center line of the lane in which the vehicle is determined to be positioned can be determined as the map point that will be associated with the bounding box.

Figure 8:
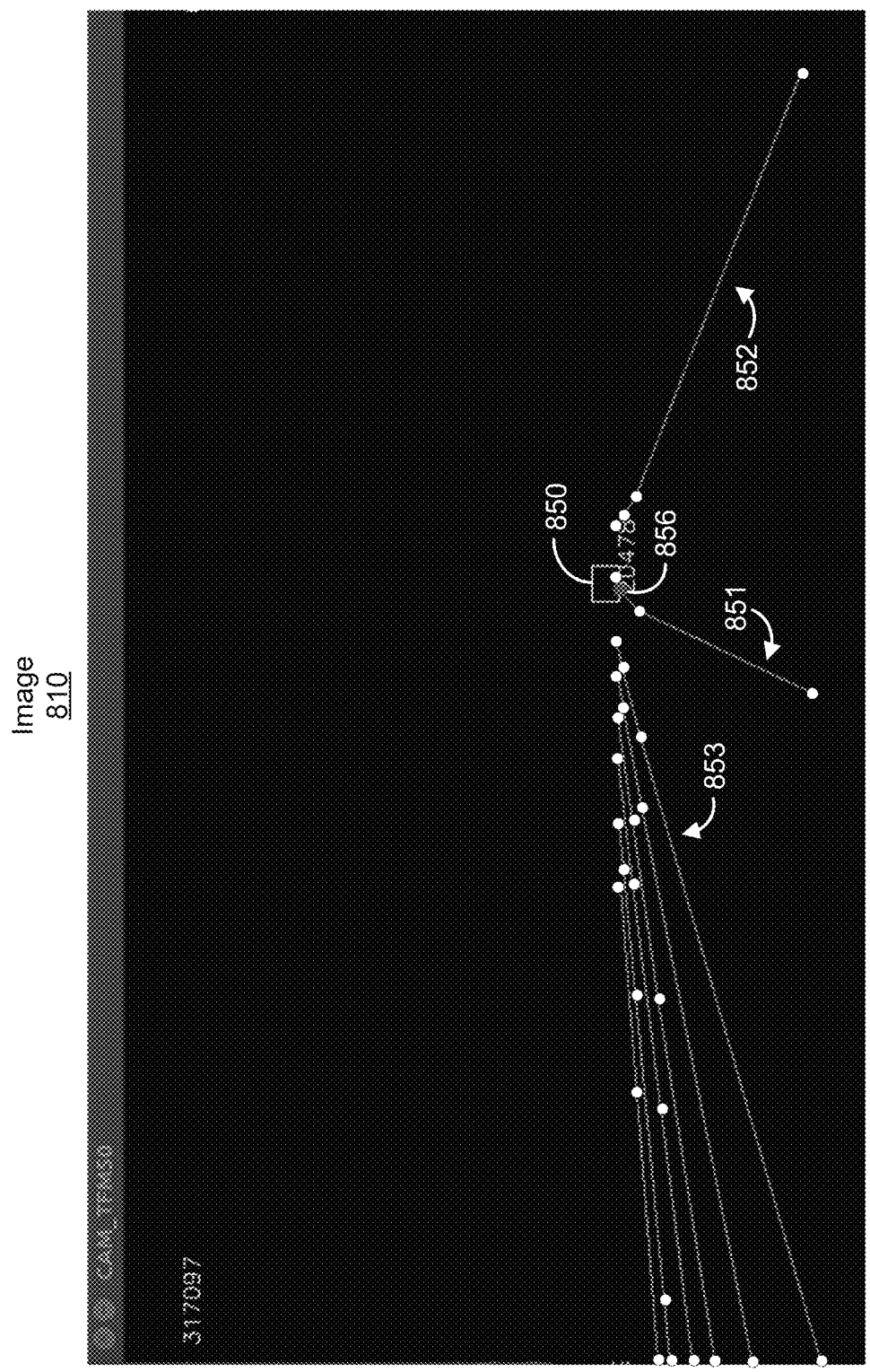
FIG. 8 is an image illustrating another example of associating a bounding region of a target object with a point from an image, in accordance with some examples.

FIG. 8 is an image 810 illustrating an example of associating a bounding box 850 of a target object detected in an image with a point 856 from the image 810. The image 810 in FIG. 8 is captured by a front-facing camera of a tracking vehicle. Center lines of lanes on a road are shown, including a lane center line 851, a lane center line 852, and a lane center line 853. The map points defining the lane center lines and that are projected onto the image 710 are shown as white dots. A bounding box 850 of a detected target object is shown. The map-based size estimation engine 208 can obtain the bottom edge of the bounding box 850, and can determine that the bottom edge intersects with the lane center line 851. The point 856 is the point of intersection where the bottom edge of the bounding box 850 intersects the lane center line 851.

As described above, a result of the map-based location association function (e.g., the Map LVA) is an associated map point from the point map 207 that is associated with the 2D bounding box of the target object (e.g., a target vehicle or other target object). The associated map point defines the orientation of the target object. For instance, using autonomous vehicles as an illustrative example, the associated map point indicates a lane in which a target vehicle is located, and it can be assumed that the orientation of the target vehicle is parallel to the lane (the longitudinal direction or front of the vehicle is pointing in a direction that is parallel to the lane). The orientation of the various lanes defined by the point map 207 are known, and thus the orientation of a target vehicle can be assumed to have the same orientation of the lane it is determined to be within.

The class or category label assigned to the detection of the target object by the object detection engine 204 also provides a strong prior example of the dimension of the target object. In one illustrative example, a class or category label of "car" for a vehicle provides an example of one or more likely dimensions for the vehicle. For instance, a width of the vehicle can be assumed given the determined class. Such an assumption is reasonable given that there is little variability in the width of vehicles within the same category or class, whereas the length and sometimes the height can vary to a larger extent.

Given the 2D the bounding box from the object detection engine 204, the associated map point determined from the map-based location association function (which defines the orientation of the target vehicle), and the assumed width of the target vehicle (or other target object) based on the determined class, the map-based size estimation engine 208 can perform the map-based inverse perspective mapping (IPM) technique to determine the 3D oriented bounding box (OBB) of the object that corresponds to the 2D bounding box from the object detection engine 204. The 3D OBB represents the size of the target vehicle (or other target object).

For example, assuming that the 2D bounding box (2D BB) of the target object (e.g., target vehicle or other object) is tangential to the projection of the 3D OBB (indicating that the projection of corners (e.g., four or more corners) of the 3D OBB lie on the edges of 2D BB), the orientation of the target object (e.g., the orientation of the target vehicle) is parallel to the orientation of the lane (or other location) in the point map 207 containing the associated map point from the map-based location association function (indicating the target object is aligned or oriented with the lane associated with the map point), and the base of the target object (e.g., the base of the target vehicle) is aligned with the tangent plane at the associated map point (indicating the bottom face of the 3D OBB lies on the plane passing through the associated map point that is tangential to the road surface at the associated map point; tangential, because the road surface could be curved at the associated map point, and it can be assumed that bottom face of 3D OBB is flat), a set of linear equations can be obtained and can be solved for the parameters that need to be estimated. Two illustrative scenarios (referred to as Scenario 1 and Scenario 2) are provided that can dictate which parameters need to be estimated. An azimuth check can be performed to determine which scenario applies. An example of the azimuth check is as follows: If $Azm_{left} Azm_{right}<0$, Scenario 1 applies, otherwise, Scenario 2 applies, where $Azm_{left}=(\hat{h} \times d_l) \cdot \hat{n}$ and $Azm_{right}=(\hat{h} \times d_r) \cdot \hat{n}$. The vector $d_l$ is the direction vector associated to the line of intersection between the map plane and the camera-bb2d-left-edge plane (which is the plane in 3D that contains the camera center as well as the right edge of the 2D detection in the image), and the vector $d_r$ is the direction vector associated to the line of intersection between the map plane and camera-bb2d-right-edge plane (which is the plane in 3D that contains the camera center as well as the right edge of the 2D detection in the image).

In Scenario 1, the map-based size estimation engine 208 can estimate the location, the height, and the length of the 3D OBB by solving the following system of linear equations:

$$\begin{bmatrix} d_b \cdot n_2 & \hat{h} \cdot n_2 & \hat{n} \cdot n_2 \\ d_b \cdot n_1 & 0 & \hat{n} \cdot n_1 \\ d_b \cdot n_t & \hat{h} \cdot n_t & \hat{n} \cdot n_t \end{bmatrix} \begin{bmatrix} \lambda \\ l \\ h \end{bmatrix} = \begin{bmatrix} -(p_b - p_2) \cdot n_2 \\ -(p_b - p_1 + w\hat{b}) \cdot n_1 \\ -(p_b - p_t + w\hat{b}) \cdot n_t \end{bmatrix}. \quad \text{Equations (4)}$$

In the equations (4), $p_1$, $p_2$, $n_1$, $n_2$ are determined by further checks on left-azimuth, $zm_{left}$, which can be summarized as follows:

If $Azm_{left}<0$, $p_1=p_l$, $n_1=n_l$, $p_2=p_r$, $n_2=n_r$, $\hat{b}=\hat{n} \times \hat{h}$,
otherwise, $p_1=p_r$, $n_1=n_r$, $p_2=p_l$, $n_2=n_l$, $\hat{b}=-\hat{n} \times \hat{h}$. Equations (5)

In Equations (4) and (5), $p_l$, $n_l$ are the point $(p_l)$ and the normal vector $(n_l)$ defining the 3D plane passing through the camera center and the left edge of the 2D BB of the target object. Similarly, $p_r$, $n_r$ are the point $(p_r)$ and the normal vector $(n_r)$ defining the plane passing through camera center and the right edge of the 2D BB of the target object. The terms $p_t$, $n_t$ are the point $(p_t)$ and the normal vector $(n_t)$ defining the plane passing through camera center and the top edge of the 2D BB. The terms $p_b$, $d_b$ are any point-direction-vector pair (with $p_b$ being the point and $d_b$ being the direction vector) defining the line of intersection of the camera-bb2d-bottom-edge plane (which is the plane in 3D that contains the camera center as well as the bottom edge of the 2D detection in the image) and the tangent plane at the associated map point (e.g., a plane tangential to the road surface at the associated map point) from the map-based location association function. The term $\hat{h}$ represent the unit vector along the heading direction and the term $\hat{n}$ represents the unit vector along the road normal at the associated map point. The vector $\hat{b}$ is a 3D vector along the lateral dimension (width) of the 3D OBB (e.g., on the road plane) and is orthogonal to the heading vector $\hat{h}$, the normal vector $\hat{n}$ is along the height of the 3D OBB and the heading vector $\hat{h}$ is along the length of the 3D OBB. The unknowns in the linear equations (4) above include: a scalar $\lambda$, which is a scalar such that $p_b+\lambda d_b$ defines the corner (or vertex) of the target object's 3D OBB (e.g., the 3D OBB of a detected target vehicle) that is closest to the tracking object (e.g., the tracking vehicle); the length l; and the height h of the target object.

In Scenario 2, the map-based size estimation engine 208 can estimate the location, the height, and the width of the 3D OBB by solving following system of linear equations:

$$\begin{bmatrix} d_b \cdot n_r & 0 & \hat{n} \cdot n_r \\ d_b \cdot n_l & \hat{b} \cdot n_l & \hat{n} \cdot n_l \\ d_b \cdot n_t & \hat{b} \cdot n_t & \hat{n} \cdot n_t \end{bmatrix} \begin{bmatrix} \lambda \\ w \\ h \end{bmatrix} = \begin{bmatrix} -(p_b - p_r) \cdot n_r \\ -(p_b - p_l) \cdot n_l \\ -(p_b - p_t + l\hat{h}) \cdot n_t \end{bmatrix}. \quad \text{Equations (6)}$$

In Equations (6), $p_l$, $n_l$ are the point $(p_l)$ and the normal vector $(n_l)$ defining the plane passing through the camera center and the left edge of the 2D BB of the target object. Similarly, $p_r$, $n_r$ are the point $(p_r)$ and the normal vector $(n_r)$ defining the plane passing through camera center and the right edge of the 2D BB of the target object. The terms $p_t$, $n_t$ are the point $(p_t)$ and the normal vector $(n_t)$ defining the plane passing through camera center and the top edge of the 2D BB. The terms $p_b$, $d_b$ are any point-direction-vector pair (with $p_b$ being the point and $d_b$ being the direction vector) defining the line of intersection of the camera-bb2d-bottom-edge plane and the tangent plane at the associated map point (from the map-based location association function). The term $\hat{h}$ represent the unit vector along the heading direction and the term $\hat{n}$ represents the unit vector along the road normal at the associated map point. The unknowns in the linear equations (4) above include: a scalar $\lambda$, which is a scalar such that $p_b+\lambda d_b$ defines the corner (or vertex) of the target object's 3D OBB that is closest to the tracking object (e.g., the tracking vehicle), the width w and the height h of the target object.

Figure 9A:
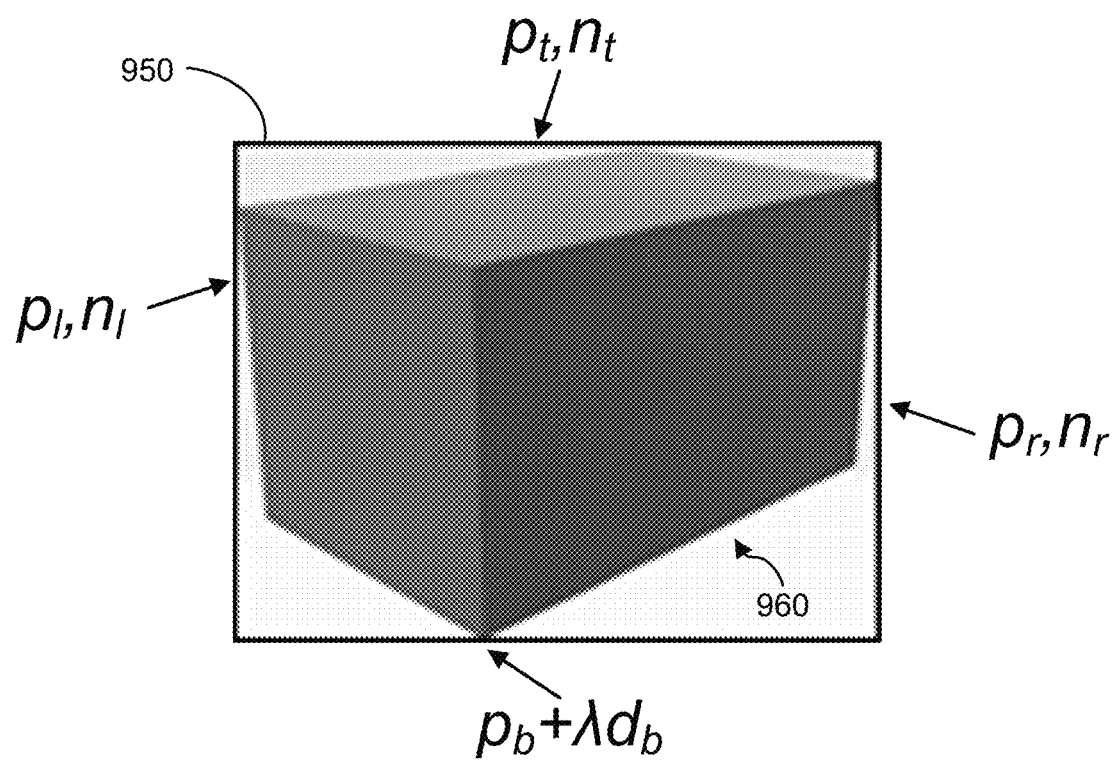
FIG. 9A is a diagram illustrating an example of geometric constraints relating corners of a three-dimensional (3D) bounding box of a target object to edges of a two-dimensional (2D) bounding box of the target object, in accordance with some examples.

FIG. 9A (representative of Scenario 1) is a diagram illustrating an example of geometric constraints relating corners (or vertices) of a 3D oriented bounding box (3D OBB) 960 of a target object to edges of the 2D bounding box (2D BB) 950 of the target object. The equations (4) and (5) apply to the scenario shown in FIG. 9A. As shown, the point and normal vector pair $p_r$, $n_r$ define the plane passing through camera center and the right edge of the 2D BB 950 of the target object, and thus the right-most corner or vertex of the 3D OBB 960 (as shown in FIG. 9A) lies on the right edge of the 2D BB 950. The point and normal vector pair $p_l$, $n_l$ defines the plane passing through the camera center and the left edge of the 2D BB 950, indicating the left-most corner of the 3D OBB 960 lies on the left edge of the 2D BB 950. The point and normal vector pair $p_t$, $n_t$ define the plane passing through camera center and the top edge of the 2D BB 950, representing that the top-most corner of the 3D OBB 960 lies on the top edge of the 2D BB 950. Once the unknown scalar $\lambda$ is determined using the equations (4), the formulation $p_b + \lambda d_b$ defines the location of the corner of the 3D OBB 960 that is closest to the tracking object (e.g., the tracking vehicle), which is the bottom-most corner in FIG. 9A. The location of the corner of the 3D OBB 960 that is closest to the tracking object provides the 3D position of the 3D OBB 960 (as noted above, the 3D orientation of the 6 DoF pose is given from the map-based location association). The location of the bottom-most corner of the 3D OBB 960 inherently defines the positions of the other three corners bordering the other edges of the 2D BB 950.

Figure 9B:
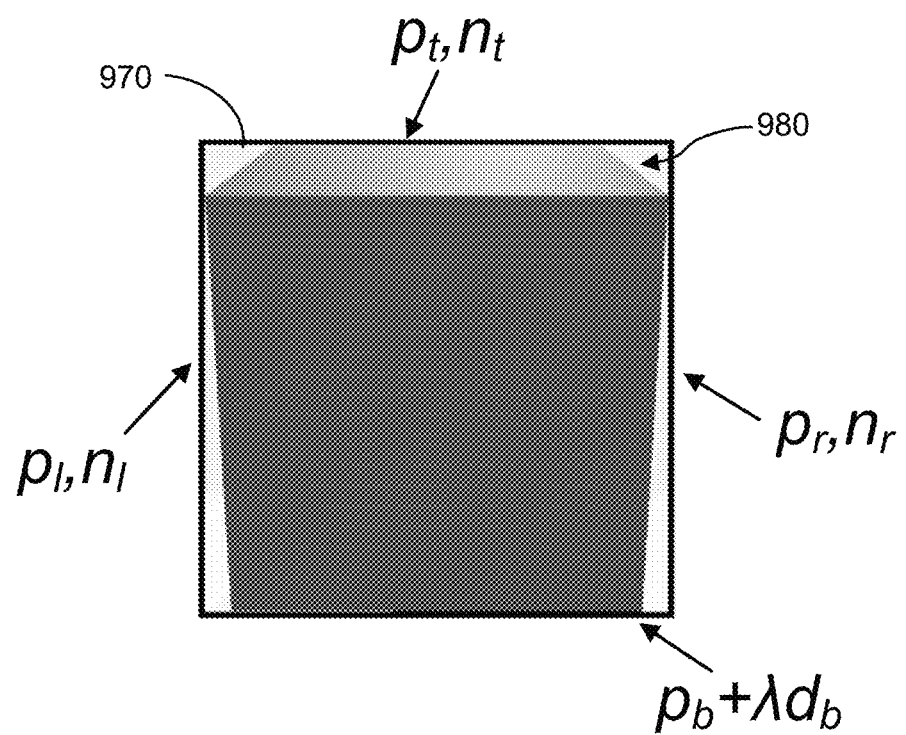
FIG. 9B is a diagram illustrating another example of geometric constraints relating corners of a three-dimensional (3D) bounding box of a target object to edges of a two-dimensional (2D) bounding box of the target object, in accordance with some examples.

FIG. 9B is a diagram representative of Scenario 2, illustrating another example of geometric constraints relating corners of a 3D oriented bounding box (3D OBB) 980 of a target object to edges of a 2D BB 970 of the target object. The equations (6) apply to the scenario shown in FIG. 9B, and the terms shown in FIG. 9B are similar as those described above with respect to FIG. 9A.

In some implementations, a feasibility assessment can be performed to determine the appropriate scenario. Once the appropriate scenario is determined by the map-based size estimation engine 208, the map-based size estimation engine 208 can apply the linear equations that correspond to determined scenario. By solving the determined set of linear equations, the map-based size estimation engine 208 can determine the estimates for the three unknowns values, including the scalar $\lambda$ (which provides the position of the target vehicle or other target object), the length l of the target vehicle or other target object, and the height h of the target vehicle or other target object.

The radar-based size estimation engine 212 can obtain radar measurements 211 from one or more radars 210 and can use the radar measurements 211 to estimate a size of a target object. A radar of the one or more radars 210 can include a device or system with a radio frequency (RF) source that sends RF signals (e.g., pulses of high-frequency electromagnetic waves), which can be reflected off of a target object back to the source of the RF signals. The reflected RF signals can be received by a RF receiver of the radar device or system. The reflected RF signals can be used to determine a size of the target object. The one or more radars 210 can include multiple radars positioned at different locations on the tracking object. For instance, using an autonomous tracking vehicle as an illustrative example, the tracking vehicle can have radars located at one or more the front, the corners, the sides, and/or the back of the vehicle. Reflected RF signals received by all of the sensors on the tracking object can be evaluated and used by the radar-based size estimation engine 212 to estimate the size (e.g., the length and/or other dimension) of the target object from which the signals were reflected.

For example, at periodic time instants, radar signals reflected off of a target object can be obtained in a most recent radar frame from multiple radar sensors positioned on the tracking object. Each radar can measures its surroundings at a fixed frequency (e.g., once per 50 milliseconds (ms) or other frequency). As used here, the term frequency refers to the measurement rate (the reciprocal of the time difference between successive measurement instances or frames. The set of measurements obtained by a radar in a single measurement instance is a radar frame. Measurements from each radar produces distinct radar frames. Radar measurements of the radar signals from the multiple radar sensors can be jointly processed, and a maximum longitudinal spread of radar measurement points along the direction of orientation of the target object can be used to determine an instantaneous estimate of the size (e.g., length or other size or dimension) of the target object. The longitudinal direction of an object, such as a vehicle or other moving object, is the forward moving direction of the object. In one example, as shown and explained below with respect to FIG. 10 and FIG. 11, the separation between the two extremities can be used by the radar-based size estimation engine 212 as an estimate of the length of the tracking object. In some implementations, the instantaneous size (e.g., length) estimates are written to a data structure that can track the top K-largest estimates obtained for the target object (where K is a fixed number). In such cases, at any point in time, the best estimate of the size (e.g., length) from the radar-based size estimation is the K-th longest instantaneous estimate obtained.

Using autonomous vehicles as an illustrative example, the radar-based size estimation engine 212 operated on a tracking vehicle can estimate the length of a target vehicle from point radar detections. However, estimating the length of a target vehicle from point radar detections can be challenging, as RF signal reflections may not be obtained from the entire extent of the target vehicle. To maximize the coverage of points from the surface of the vehicle, pings from all radars on the tracking vehicle can be jointly considered. For instance, at periodic time instants, radar signals reflected from the target vehicle obtained in a most recent radar frame from all radar sensors on the tracking vehicle are jointly considered, and the maximum longitudinal spread of the points along the direction of orientation (referred to as the longitudinal direction) of the tracked vehicle is used to get an instantaneous estimate of the length of the vehicle. The maximum longitudinal spread represents the separation between the two longitudinal extremities of the object (between the front and back of a vehicle), providing an estimate of the length of the object. For example, if all points are projected onto a line oriented parallel to the longitudinal direction, then the extreme points in the projection are the extremities (where the distance between these extreme projected gives an estimate of the length). The longitudinal direction is defined above as the direction of orientation of the tracked object. The orientation can be known from tracking the object (e.g., a target vehicle). If the orientation is not known, the orientation can be determined using the point map 207 using the orientation of a location defined in the point map 207 relative to the object (e.g., the orientation of the lane at the location of the tracked vehicle, as described above).

Figure 10:
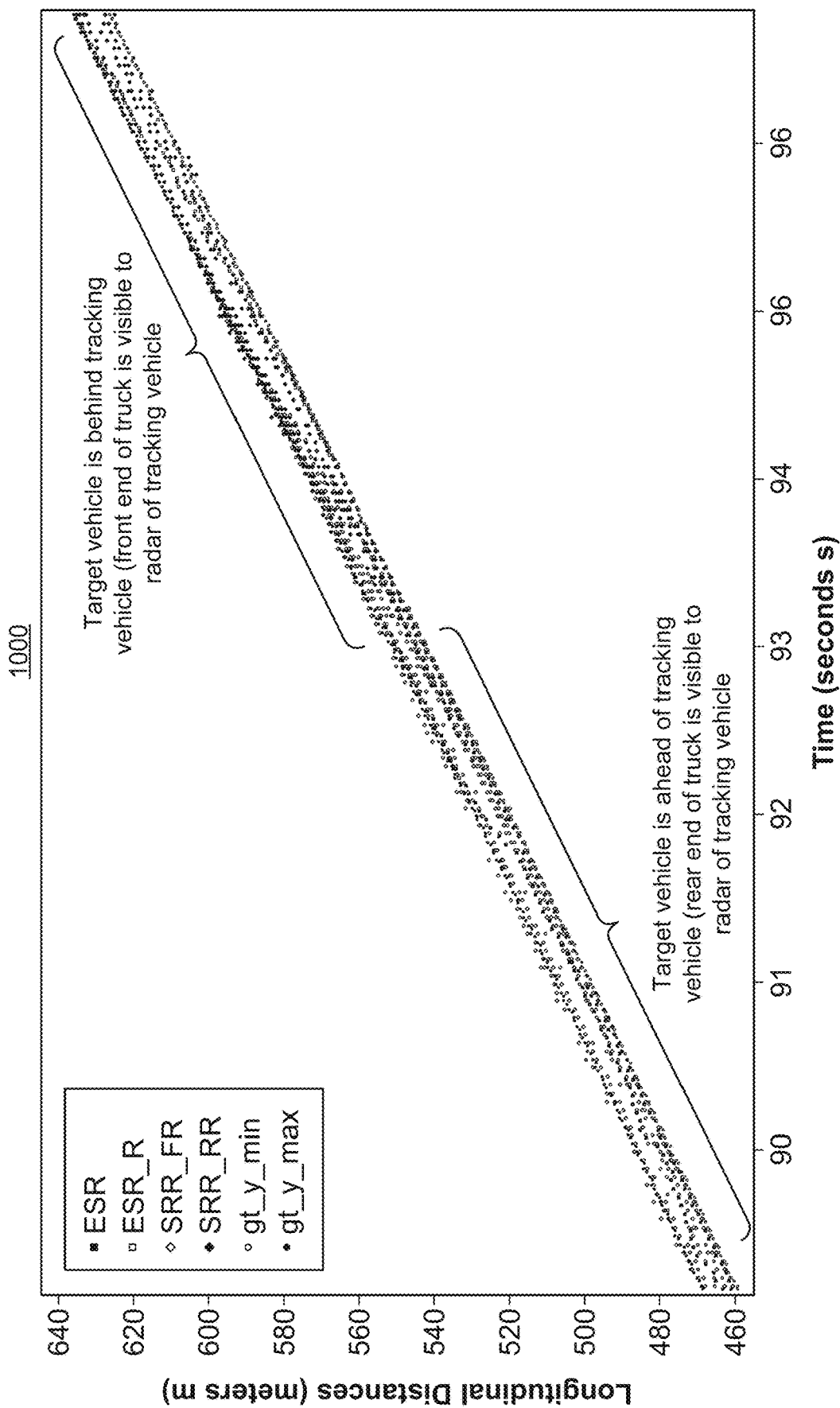
FIG. 10 is a graph illustrating an example of longitudinal components of radar measurements received by various radar sensors plotted against time, in accordance with some examples.

FIG. 10 is a graph 1000 illustrating an example of the longitudinal components of radar measurements (along the y-axis) received by various radar sensors plotted against time (along the x-axis). The radar measurements are RF signal reflections from a target vehicle received by different radars on the front, rear, and corners of the tracking vehicle, plotted against time. The measurement data in FIG. 10 spans a 7 second interval during which the tracking vehicle overtakes (or passes) the target vehicle on a road. The black dots represent the ground truth positions (denoted as ground truth y-minimum (gt_y_min) and ground truth y-maximum (gt_y_max)), which correspond to the actual positions of the front and rear end of the target vehicle, and are shown for reference. Each color of dot represents a measurement from a different radar. For example, the red dots represent radar measurements from the long range radar (denoted as ESR) on the front of the tracking vehicle. As shown, the different radars receive RF signals reflected from the target object at different times. For example, from approximately second 89 to second 93, the radar on the front (red dots, denoted as ESR) and the radar on the front-right corner (dark blue dots, denoted as SRR_FR) of the tracking vehicle provide radar measurements for the target vehicle, which is when the target vehicle is in front of and beside the tracking vehicle as the tracking vehicle overtakes the target vehicle. From approximately 91.5 seconds to 97 seconds, the radar on the rear-right corner of the tracking vehicle (light dark blue dots, denoted as SRR_RR) provide radar measurements for the target vehicle. From approximately 94 seconds to 97 seconds, the radar on the rear of the tracking vehicle (green dots, denoted as ESR_R) provide radar measurements for the target vehicle.

It can be seen from the measurements shown in the graph 1000 that the radars initially (from approximately second 89 to second 93) reliably observe the rear end of the target vehicle and later (from approximately second 93 to second 97) reliably observe the front end of the target vehicle, when compared with the ground truth positions represented by the black dots. It can also be seen that, when the target vehicle is in front of the tracking vehicle, radar pings are consistently obtained from the rear of the target vehicle. Similarly, it can be seen that, when the target vehicle is in the rear of the tracking vehicle, radar pings are consistently obtained from the front of the target vehicle.

Figure 11:
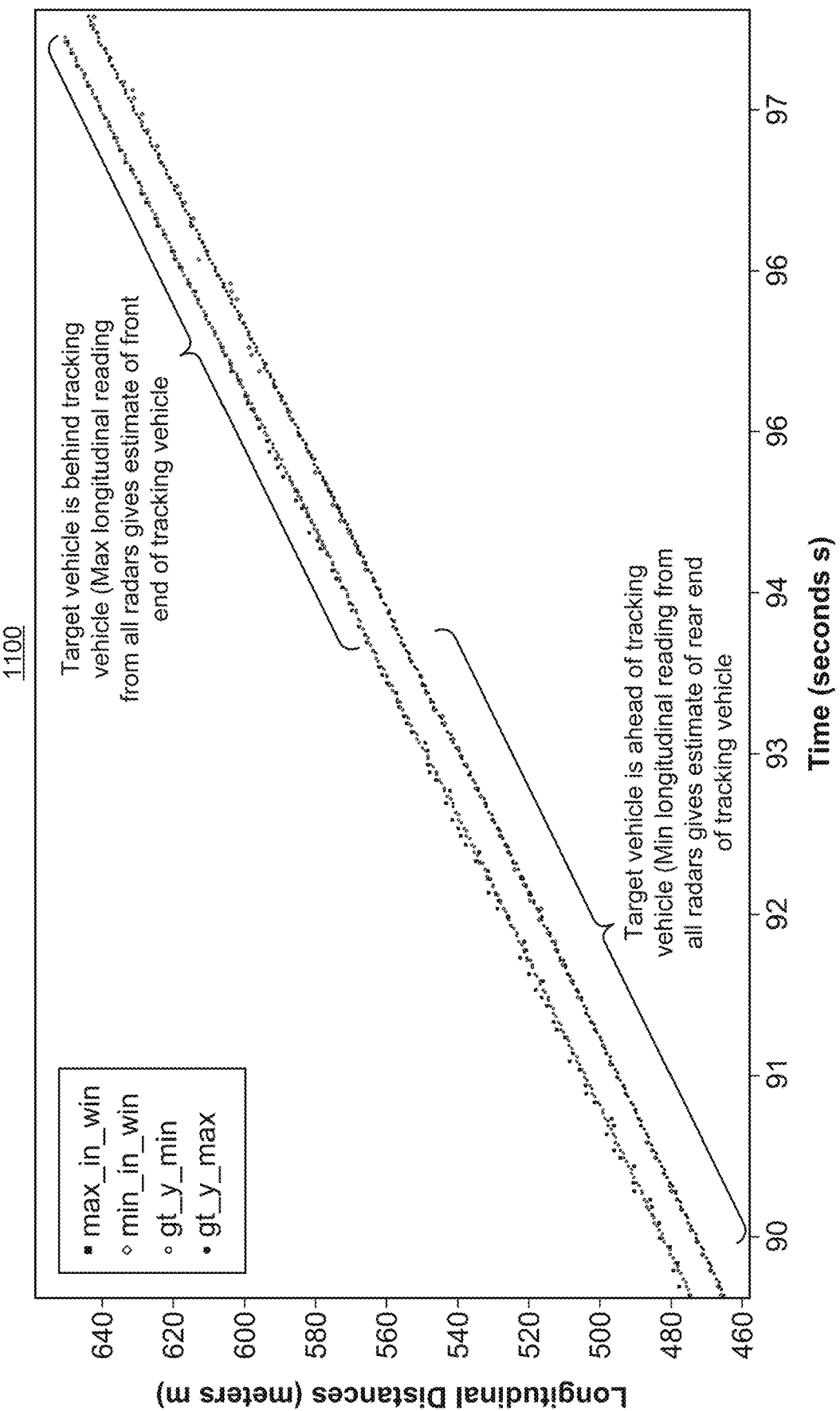
FIG. 11 is a graph illustrating an example of estimates of the longitudinal extremities of a target object determined using the radar measurements shown in FIG. 10, in accordance with some examples.

FIG. 11 is a graph 1100 illustrating an example of estimates of the longitudinal extremities of the target vehicle determined using the radar measurements shown in the graph 1000 of FIG. 10. The term "max_in_win" is a maximum in a window of time along the longitudinal direction, and the term "min_in_win" is a minimum in the window of time along the longitudinal direction. The longitudinal extremities refer to the measurement that is the maximum or minimum longitude at a given point in time (e.g., the largest or smallest longitudinal value in a given frame). The red dots (the max longitudinal extremity) represent an estimate of the front end of the target vehicle and the green dots (the min longitudinal extremity) represent an estimate of the rear end of the target vehicle. The separation between the two longitudinal extremities from the graph (representing the front and back of the vehicle) at any given time instant provides the radar-based size estimation engine 212 an estimate of the length of the target vehicle.

The estimates of the longitudinal extremities of the target vehicle can be calculated by batch estimation. As used herein, a batch is the observations in a window of time which are processed to arrive at an estimate of the length or other size. For example, a single batch can include the set of all measurements that are obtained within a certain window of time (e.g., a 50 millisecond window of time) from all sensors. The estimate of the front end of the target vehicle is accurate when the target vehicle is behind the tracking vehicle, and the estimate of the rear end of the target vehicle is accurate when the target vehicle is in front of the tracking vehicle. Both estimates are reliable when the target vehicle is longitudinally close to the tracking vehicle.

In some cases, the point radar measurements can be sparse (few in number and low in spatial density), even with multiple radars. Because of the sparseness of the point radar detections, the extremities of the vehicle may not be observed, and the instantaneous length estimate may underestimate the length of the vehicle or other object. As described above, the instantaneous estimates can be written to a data structure (e.g., an array of measurement values) that can track the top K largest estimates ever obtained for the target vehicle, where K is a fixed number. At any point of time, the best estimate of the length (or other dimension) from the radar-based length estimation is the K-th largest instantaneous estimate obtained. For instance, K=1 would be the largest estimate and K=5 would be the 5-th largest estimate. Any number can be used as the selected estimate, such as K=3. In some examples, the reliability of the estimate produced by the radar-based length estimation can be quantified based on the position of the target vehicle relative to the fields of view of the different radars. For example, the closer the target vehicle is to the tracking vehicle (or ego vehicle), the more reliable the size estimation.

While the above examples of the radar-based estimation describe determining a length of an object based on longitudinal measurements (corresponding to the longitudinal direction of the object), similar techniques can be performed using latitudinal measurements of an object (corresponding to the latitudinal direction of the object, such as the direction perpendicular to the forward moving direction of a vehicle or other moving object) to determine a width of the object.

Figure 12B:
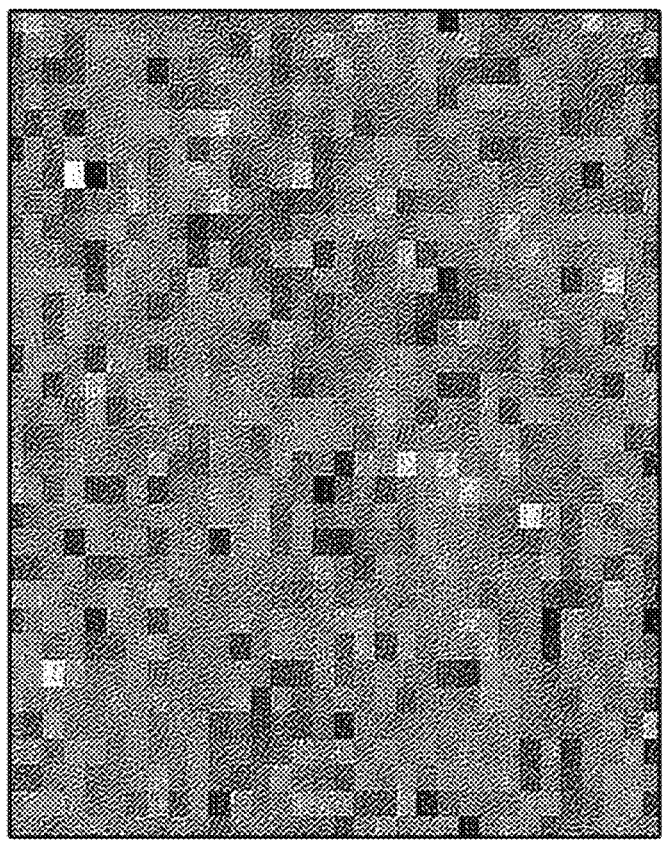
FIG. 12A and FIG. 12B are illustrative examples of radar images, in accordance with some examples.
Figure 12A:
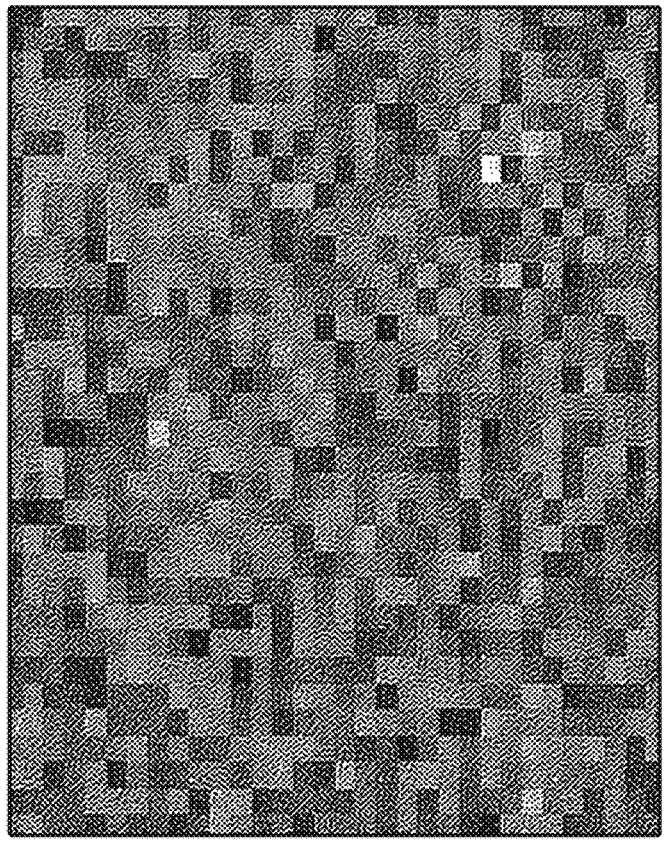

In some examples, a tracking object (e.g., a tracking vehicle or other object) can include imaging radar sensors. Radar images can have any suitable frequency, such as frequencies in the millimeter bands or microwave bands. Illustrative examples of radar images are shown in FIG. 12A and FIG. 12B. Examples of radar images that can be used for position and size/dimension estimation include 10 GHz images, 30 GHz images, 60 GHz images, 100 GHz images, 300 GHz images, and/or radar images having any other suitable high frequency. Radar images may be millimeter wave radar images, which are radar images having short wavelengths that range from a first wavelength size (e.g., 1 millimeter) to a second wavelength size (e.g., 10 millimeters) and/or falling into a band or range of spectrum between a first frequency (e.g., 30 Ghz) and a second frequency (e.g., 300 Ghz). Millimeter wave radar images are sometimes referred to as millimeter band, extremely high frequency (EHF), or very high frequency (VHF). Other radio frequencies and wavelengths outside of the millimeter band may alternately or additionally be used, such as bands in the microwave region between 300 megahertz (MHz) and 30 GHz. In some cases, the radar images can be received directly from a radar system. In some cases, the radar images can be retrieved from a storage device or a memory included in the system 200 or included in the object or device that includes the system 200. In some cases, the radar images can be retrieved from a storage device or a memory that is external to the system 200 or external to the object or device including the system 200.

The radar system can include an array of antennas, with each antenna including or being coupled with a receiver. In some implementations, the radar system can have a single transmitter that can transmit a radio frequency (RF) signal, which reflects off of one or more objects (e.g., a target object) in an environment. In such implementations, the antennas and receivers of the array of antennas receive the reflected RF signals originating from the transmitter, with each antenna and receiver receiving a different version of the reflected signals. Each antenna and receiver can record data such as amplitude and phase of the received reflected signals. In other implementations, each antenna of the antenna array can include or be coupled with a transmitter, in which case a receiver-transmitter pair is provided for each antenna in the array. For a given receiver-transmitter pair, the transmitter can transmit an RF signal that reflects off of one or more objects (e.g., a face) in the environment, and the receiver can receive the reflected RF signal.

In some examples, the radar system can be implemented as one or more multi-gigabit radios on the tracking object (e.g., a tracking vehicle or other tracking object). For example, multi-gigabit technologies (e.g., multi-gigabit WLAN technologies) using high frequency bands (e.g., 10 GHz, 30 GHz, 60 GHz, 100 GHz images, 300 GHz, or other suitable high frequency) can be implemented for wireless communications in many computing devices (e.g., mobile devices, autonomous vehicles, etc.). Multi-gigabit radios can be operated in a radar mode for capturing a transmitted signal reflected by nearby objects. In some implementations, the one or more multi-gigabit radios can be used for generating the radar images. In one illustrative example, the one or more multi-gigabit radios can include one or more 60 GHz WLAN radios. In such examples, a multi-gigabit radio can include the array of antennas (along with the receivers and the transmitter, or the receiver-transmitter pairs).

Each pixel of a radar image can correspond to an antenna (and receiver or receiver-transmitter pair) from the array (e.g., a one-dimensional array, a two-dimensional array, or other dimension) of antennas. With a one-dimensional array, the "image" that is obtained is a reflection intensity image with axes along range_to_target and azimuth_angle of target. In another illustrative example, the array of antennas can include an array of 32×32 antennas, in which case the radar system includes a total of 1024 antennas. An image generated by such a radar system will include a two-dimensional array of 32×32 pixels, with each pixel corresponding to an antenna. The image will thus have a total of 1024 pixels. The width and height of the image—and the number of pixels or voxels along is each side—is thus a function of the number of antennas in the array. At least as discussed here, the term "antenna" should be understood to represent either just an antenna (for at least one receiver, transmitter, transceiver, or a combination thereof corresponding included in or coupled to the array), or can represent an entire receiver, transmitter, or transceiver. In this way, the array of antennas may be an array of receivers, transmitters, transceivers, or a combination thereof.

In some cases, the antennas (and receivers) from the array of antennas of the radar system can sort signals into different range bins n, which correspond to different distance ranges. For example, each antenna (and receiver) can sort the received RF signal returns into a set of bins n by time of arrival relative to the transmit pulse. The time interval is in proportion to the round-trip distance to the object(s) reflecting the RF waves. By checking the receive signal strength in the bins, the antennas (and receivers) can sort the return signals across the different bins n (the bins corresponding to different ranges). This can be performed while scanning across desired azimuths and elevations. Having many range bins allows more precise range determinations. A short duration pulse can be detected and mapped into a small number of range bins (e.g., only one or two range bins), whereas a longer pulse duration, width, and/or transmission power allows for a greater amount of signal energy to be transmitted and a longer time for the receiver to integrate the energy, resulting in a longer detection range. When the received signals are sorted into range bins, a radar image can be generated for each range bin n.

The imaging radar sensors can provide instantaneous estimates of the position (and/or orientation) and dimensions of the target vehicle. In some examples, using image-based processing and/or deep neural networks, when a target vehicle is detected in an imaging radar image, the system 200 can also generate an estimate of the length of the vehicle. For instance, each time an imaging radar makes a measurement, it essentially produces an image of the scene around the imaging radar. This image is a gray scale image with one axis along range and another along the azimuth angle. The intensity of a pixel in the image is the intensity of returns from a reflector at that particular range and azimuth. A deep learning network trained to perform object detection on radar images can be a modification of the object detection network used by the object detection engine 204, but trained on radar images to detect the position and extent of target objects (e.g., vehicles). Unlike detections in camera images, the detections using radar images can be obtained in the top perspective view (the "birds eye view"), which means that the length and width of the vehicle are preserved in the image. A by-product of the detections using radar images is thus an estimate of the length of the vehicle.

The size estimation engine 214 can use any combination of the results from the class likelihood estimation engine 206, the map-based size estimation engine 208, and/or the radar-based size estimation engine 212 to determine a size (e.g., a length and/or height) and a position and/or orientation of a target object. For example, in some cases, the size estimation engine 214 can apply an estimation model that takes into account the map-based size estimation from the map-based size estimation engine 208, the radar-based size estimation from the radar-based size estimation engine 212, and/or the likelihood estimation from the class likelihood estimation engine 206 to determine a final estimated size for a target object (e.g., a length of a target vehicle). In some implementations, the estimation model can include an estimation framework (e.g., a Bayesian estimation framework or other estimation model framework) that operates as a Kalman filter.

For instance, again using autonomous vehicles for illustrative purposes, the final estimate of the length (or other estimated dimension) of a target vehicle can obtained by a sequential Bayesian estimation framework, which can be interpreted as a degenerate Kalman filtering framework in which the state, representing the length of the object (e.g., vehicle), is modeled as static and does not change over time. For example, because the length of the object (e.g., vehicle) is fixed, there are no dynamics associated with the state, no state transitions, no state evolution, etc. The length X can be assumed to be a Gaussian random variable with a prior distribution with mean equal to the standard length (or other estimated dimension) of vehicles in the class of the tracked vehicle (e.g., as determined by the class likelihood estimation engine 206), and a variance given by the typical variance of length for the class of the tracked vehicle. The length estimate (or other estimated dimension) can be sequentially refined using Bayesian estimation as new measurements $Y_i$ of length are received from any combination of one or more of the map-based size estimation engine 208, the radar-based size estimation engine 212, and/or the radar image-based size estimation described above. These measurements $Y_i$ can be modeled as independent estimates of the length perturbed by Gaussian noise (denoted as $N_i$) as follows:

$$Y_i = X + N_i \qquad \text{Equation (7).}$$

The standard deviation of the noise from the different measurements $Y_i$ is set to be equal to the standard deviation of error in the measurements. In some examples, an outlier rejection is performed on the measurements $Y_i$ based on the class of the target vehicle (determined by the class likelihood estimation engine 206) so that only feasible lengths are provided as inputs to the Bayesian filter. For example, as described above, the object class estimated by the class likelihood estimation engine 206 can be used to define upper and lower limits to the size (e.g., the length, width, and/or height) of the target object. The upper and lower limits represent a maximum size and a minimum size, respectively, of a target object for a given class or category. Any estimated length outside of the upper and lower limits (e.g., smaller than the lower limit or bigger than the upper limit) can be rejected by the size estimation engine 214 and not input to the Bayesian filter.

The best estimate $\hat{X}_i$ of the length (or other dimension, such as height) of the target vehicle after processing measurement $Y_i$ can be computed recursively as:

$$\hat{X}_i = \widehat{X_{t-1}} + \frac{\sigma_{t-1}^2}{\sigma_{t-1}^2 + \sigma_i^2} (Y_i - \widehat{X_{t-1}}), \qquad \text{Equation 8}$$

where $\sigma_{t-1}$ is the standard deviation of the current estimate $\hat{X}_i$ of the length, and $\sigma_i$ represents the standard deviation of the noise $N_i$ in measurement $Y_i$. The standard deviation of the estimate is updated as:

$$\sigma_t^2 = \frac{\sigma_{t-1}^2 \sigma_w^2}{\sigma_{t-1}^2 + \sigma_w^2}$$

While length is used as an example of a dimension of a target object that can be estimated by the size estimation engine 214, the same approach can be also used to filter the width and height estimates of a target object (e.g., a target vehicle) obtained from the map-based size estimation engine 208. In some cases, for certain objects (such as vehicles), the heights and widths of those objects do not vary by a large amount between different models of the same class of object (e.g., there is a small variance in width and sometimes height for different models of the same vehicle type). In such cases, the size estimation engine 214 can predict the width and/or the height of a target object (e.g., a target vehicle or other object) as a constant based on the most likely class identified by the class likelihood estimation engine 206.

In a multi-target tracking scenario where a tracking object is tracking multiple target objects at the same time. For example, an autonomous vehicle may need to track multiple other vehicles on a road when driving. In such a multi-target tracking scenario, the size estimation engine 214 can be preceded by an association engine (not show) that can associate camera-based object detections from the object detection engine 204, radar-based estimations from the radar-based size estimation engine 212, and/or imaging radar-based estimations to the correct target track (where, as noted above, a track refers to an estimate maintained for each detected target object).

Using different sources of information for different size and/or position estimations, such as the map-based estimation that utilizes results from image-based object detection and the radar-based detection, allows the different estimations to complement one another. For example, a image-based based object detection can provide the same or similar detection result for two different objects that are vastly different in length, due to a slight difference in yaw angle. The radar-based estimation can supplement the map-based estimation. Furthermore, radar sensors being less prone to varying weather conditions such as rain or snow, and not being affected by variations in exposure to sunlight, serve as a complementary solution to camera based size estimation methods, thus improving overall system robustness. Utilizing the multiple sources of information can help the system 200 obtain highly accurate size and position estimations, allowing a tracking object that includes the system 200 to make more accurate estimates of the environment surrounding the tracking object. For example, using the techniques described herein, an autonomous vehicle can make more accurate estimates of the space of a road that is available for maneuvering, such as for performing lane changes, overtaking other vehicles, stopping, speeding up, among others. In another example, a robotic device used for manufacturing can use the techniques described herein to more accurately identify the available space and parts that are available to the robotic device. Many other fields of technology can benefit from the accurate size and position (and/or orientation) estimation techniques provided herein.

As described above with respect to the object detection engine 204, various models using neural network-based detectors can be used to detect objects in images. Illustrative examples of neural networks that can be used by object detectors include convolutional neural networks (CNNs), autoencoders, deep belief nets (DBNs), Recurrent Neural Networks (RNNs), Generative Adversarial Networks (GANs), or any other suitable neural network.

Figure 13:
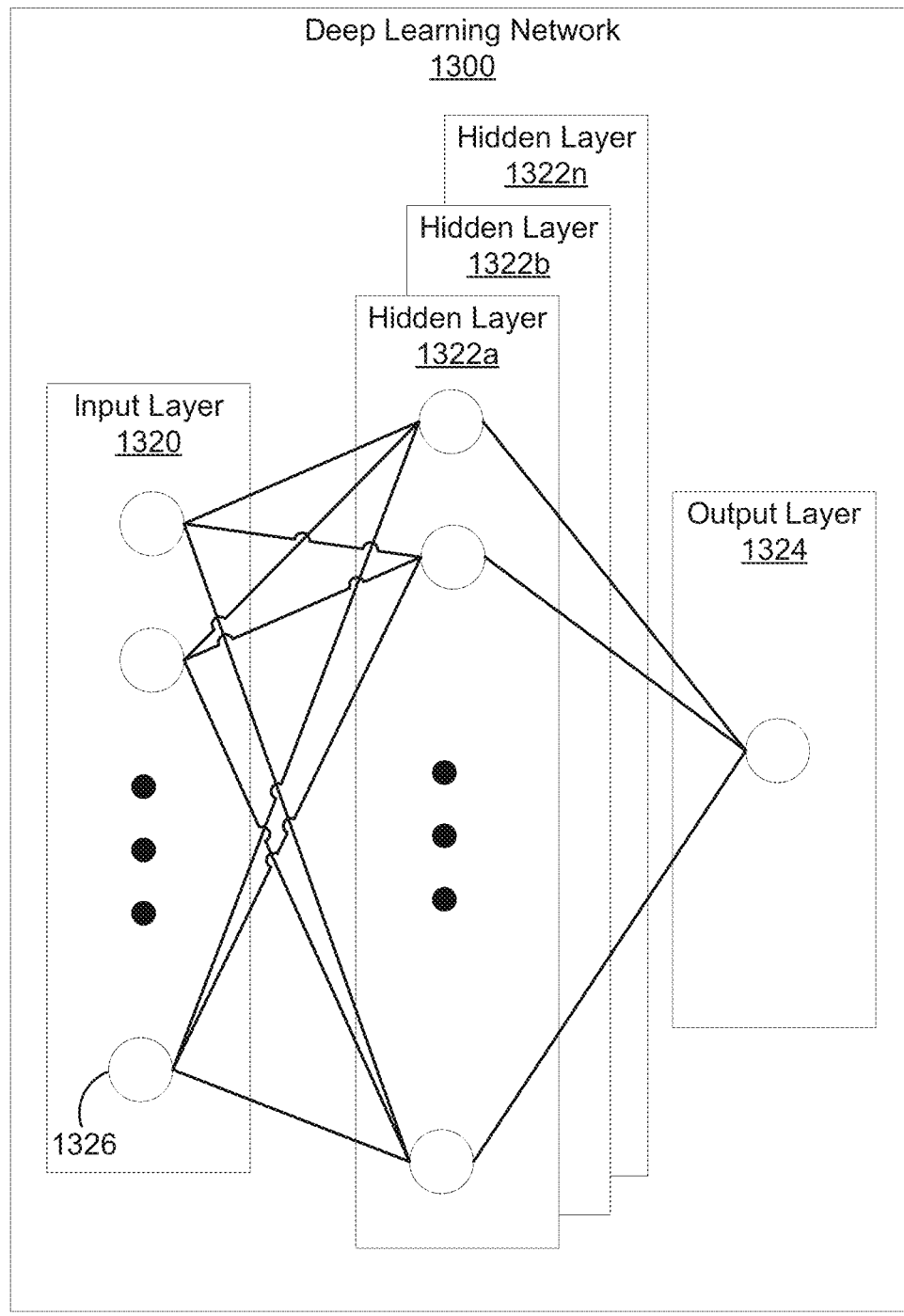
FIG. 13 is a block diagram illustrating an example of a deep learning network, in accordance with some examples.

FIG. 13 is an illustrative example of a deep learning neural network 1300 that can be used by the object detection engine 204. An input layer 1320 includes input data. In one illustrative example, the input layer 1320 can include data representing the pixels of an input video frame. The neural network 1300 includes multiple hidden layers 1322*a*, 1322*b*, through 1322*n*. The hidden layers 1322*a*, 1322*b*, through 1322*n* include "n" number of hidden layers, where "n" is an integer greater than or equal to one. The number of hidden layers can be made to include as many layers as needed for the given application. The neural network 1300 further includes an output layer 1324 that provides an output resulting from the processing performed by the hidden layers 1322*a*, 1322*b*, through 1322*n*. In one illustrative example, the output layer 1324 can provide a classification for an object in an input video frame. The classification can include a class identifying the type of object (e.g., a person, a dog, a cat, or other object).

The neural network 1300 is a multi-layer neural network of interconnected nodes. Each node can represent a piece of information. Information associated with the nodes is shared among the different layers and each layer retains information as information is processed. In some cases, the neural network 1300 can include a feed-forward network, in which case there are no feedback connections where outputs of the network are fed back into itself. In some cases, the neural network 1300 can include a recurrent neural network, which can have loops that allow information to be carried across nodes while reading in input.

Information can be exchanged between nodes through node-to-node interconnections between the various layers. Nodes of the input layer 1320 can activate a set of nodes in the first hidden layer 1322a. For example, as shown, each of the input nodes of the input layer 1320 is connected to each of the nodes of the first hidden layer 1322a. The nodes of the hidden layers 1322a, 1322b, through 1322n can transform the information of each input node by applying activation functions to these information. The information derived from the transformation can then be passed to and can activate the nodes of the next hidden layer 1322b, which can perform their own designated functions. Example functions include convolutional, up-sampling, data transformation, and/or any other suitable functions. The output of the hidden layer 1322b can then activate nodes of the next hidden layer, and so on. The output of the last hidden layer 1322n can activate one or more nodes of the output layer 1324, at which an output is provided. In some cases, while nodes (e.g., node 1326) in the neural network 1300 are shown as having multiple output lines, a node has a single output and all lines shown as being output from a node represent the same output value.

In some cases, each node or interconnection between nodes can have a weight that is a set of parameters derived from the training of the neural network 1300. Once the neural network 1300 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1300 to be adaptive to inputs and able to learn as more and more data is processed.

The neural network 1300 is pre-trained to process the features from the data in the input layer 1320 using the different hidden layers 1322a, 1322b, through 1322n in order to provide the output through the output layer 1324. In an example in which the neural network 1300 is used to identify objects in images, the neural network 1300 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1300 can adjust the weights of the nodes using a training process called back-propagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1300 is trained well enough so that the weights of the layers are accurately tuned.

For the example of identifying objects in images, the forward pass can include passing a training image through the neural network 1300. The weights are initially randomized before the neural network 1300 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1300, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1300 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma \frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1300 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1300 can include any suitable deep network. One example includes a convolutional neural network (CNN), which includes an input layer and an output layer, with multiple hidden layers between the input and out layers. An example of a CNN is described below with respect to FIG. 14. The hidden layers of a CNN include a series of convolutional, nonlinear, pooling (for downsampling), and fully connected layers. The neural network 1300 can include any other deep network other than a CNN, such as an autoencoder, a deep belief nets (DBNs), a Recurrent Neural Networks (RNNs), among others.

Figure 14:
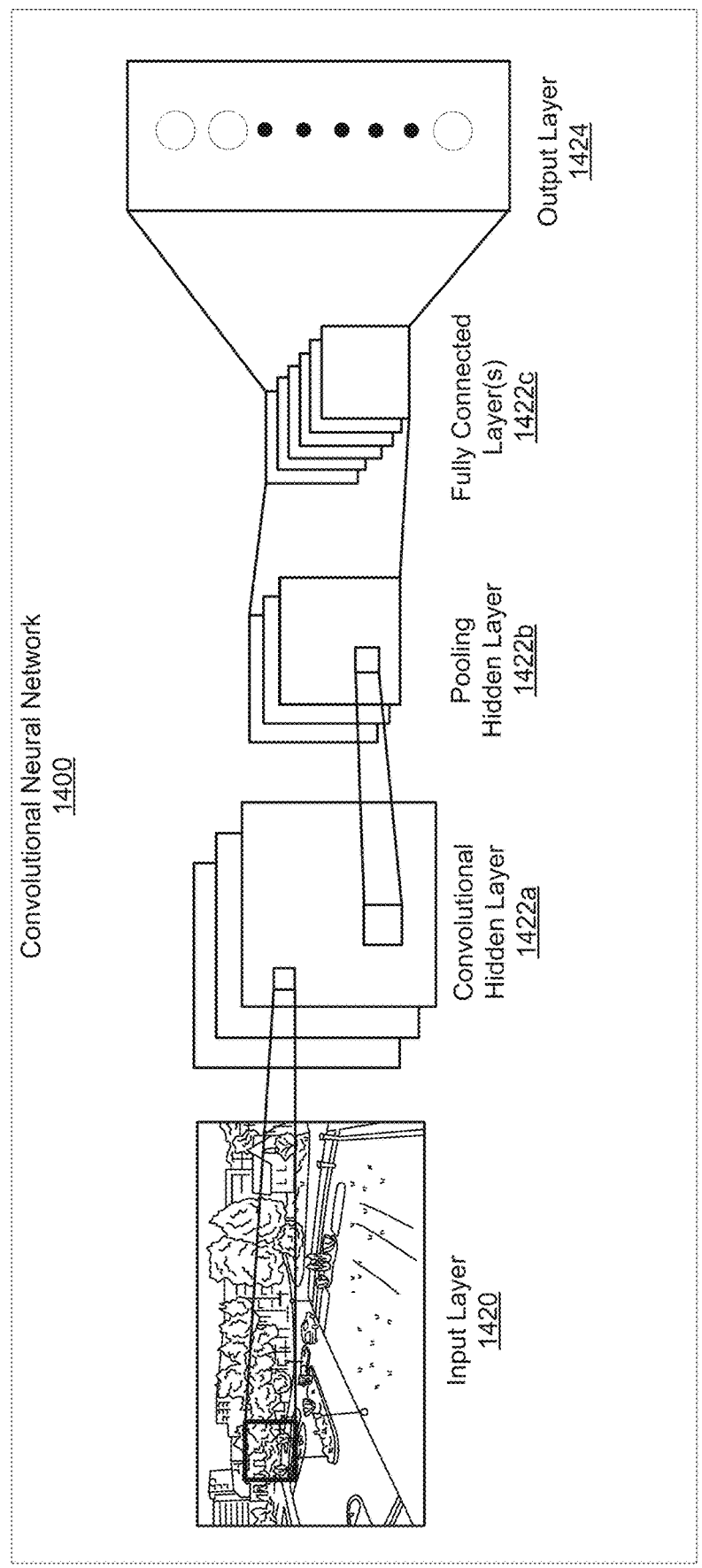
FIG. 14 is a block diagram illustrating an example of a convolutional neural network, in accordance with some examples.

FIG. 14 is an illustrative example of a convolutional neural network 1400 (CNN 1400). The input layer 1420 of the CNN 1400 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1422a, an optional non-linear activation layer, a pooling hidden layer 1422b, and fully connected hidden layers 1422c to get an output at the output layer 1424. While only one of each hidden layer is shown in FIG. 14, one of ordinary skill will appreciate that multiple convolutional hidden layers, non-linear layers, pooling hidden layers, and/or fully connected layers can be included in the CNN 1400. As previously described, the output can indicate a single class of an object or can include a probability of classes that best describe the object in the image.

The first layer of the CNN 1400 is the convolutional hidden layer 1422a. The convolutional hidden layer 1422a analyzes the image data of the input layer 1420. Each node of the convolutional hidden layer 1422a is connected to a region of nodes (pixels) of the input image called a receptive field. The convolutional hidden layer 1422a can be considered as one or more filters (each filter corresponding to a different activation or feature map), with each convolutional iteration of a filter being a node or neuron of the convolutional hidden layer 1422a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1422a. Each connection between a node and a receptive field for that node learns a weight and, in some cases, an overall bias such that each node learns to analyze its particular local receptive field in the input image. Each node of the hidden layer 1422a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1422a is due to each node of the convolutional layer being applied to its corresponding receptive field. For example, a filter of the convolutional hidden layer 1422a can begin in the top-left corner of the input image array and can convolve around the input image. As noted above, each convolutional iteration of the filter can be considered a node or neuron of the convolutional hidden layer 1422a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1422a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1422a.

The mapping from the input layer to the convolutional hidden layer 1422a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1422a can include several activation maps in order to identify multiple features in an image. The example shown in FIG. 14 includes three activation maps. Using three activation maps, the convolutional hidden layer 1422a can detect three different kinds of features, with each feature being detectable across the entire image.

In some examples, a non-linear hidden layer can be applied after the convolutional hidden layer 1422a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1400 without affecting the receptive fields of the convolutional hidden layer 1422a.

The pooling hidden layer 1422b can be applied after the convolutional hidden layer 1422a (and after the non-linear hidden layer when used). The pooling hidden layer 1422b is used to simplify the information in the output from the convolutional hidden layer 1422a. For example, the pooling hidden layer 1422b can take each activation map output from the convolutional hidden layer 1422a and generates a condensed activation map (or feature map) using a pooling function. Max-pooling is one example of a function performed by a pooling hidden layer. Other forms of pooling functions be used by the pooling hidden layer 1422a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1422a. In the example shown in FIG. 14, three pooling filters are used for the three activation maps in the convolutional hidden layer 1422a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1422a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1422a having a dimension of 24×24 nodes, the output from the pooling hidden layer 1422b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1400.

The final layer of connections in the network is a fully-connected layer that connects every node from the pooling hidden layer 1422b to every one of the output nodes in the output layer 1424. Using the example above, the input layer includes 28×28 nodes encoding the pixel intensities of the input image, the convolutional hidden layer 1422a includes 3×24×24 hidden feature nodes based on application of a 5×5 local receptive field (for the filters) to three activation maps, and the pooling layer 1422b includes a layer of 3×12×12 hidden feature nodes based on application of max-pooling filter to 2×2 regions across each of the three feature maps. Extending this example, the output layer 1424 can include ten output nodes. In such an example, every node of the 3×12×12 pooling hidden layer 1422b is connected to every node of the output layer 1424.

The fully connected layer 1422c can obtain the output of the previous pooling layer 1422b (which should represent the activation maps of high-level features) and determines the features that most correlate to a particular class. For example, the fully connected layer 1422c layer can determine the high-level features that most strongly correlate to a particular class, and can include weights (nodes) for the high-level features. A product can be computed between the weights of the fully connected layer 1422c and the pooling hidden layer 1422b to obtain probabilities for the different classes. For example, if the CNN 1400 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1424 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 15:
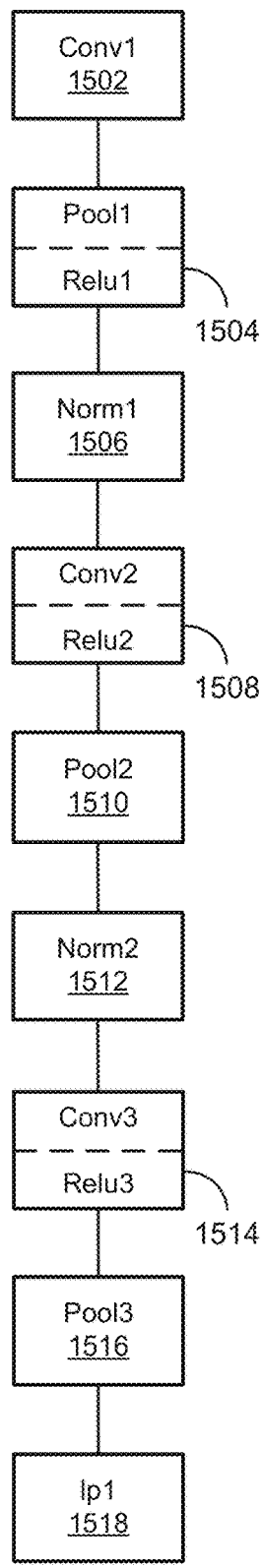
FIG. 15 is a diagram illustrating an example of the Cifar-10 neural network, in accordance with some examples.

One specific example of a neural network based detector that can be used by the object detection engine 204 is a Cifar-10 neural network based detector. FIG. 15 is a diagram illustrating an example of the Cifar-10 neural network 1500. In some cases, the Cifar-10 neural network can be trained to classify persons and cars only. As shown, the Cifar-10 neural network 1500 includes various convolutional layers (Conv1 layer 1502, Conv2/Relu2 layer 1508, and Conv3/Relu3 layer 1514), numerous pooling layers (Pool1/Relu1 layer 1504, Pool2 layer 1510, and Pool3 layer 1516), and rectified linear unit layers mixed therein. Normalization layers Norm1 1506 and Norm2 1512 are also provided. A final layer is the ip1 layer 1518.

Figure 16B:
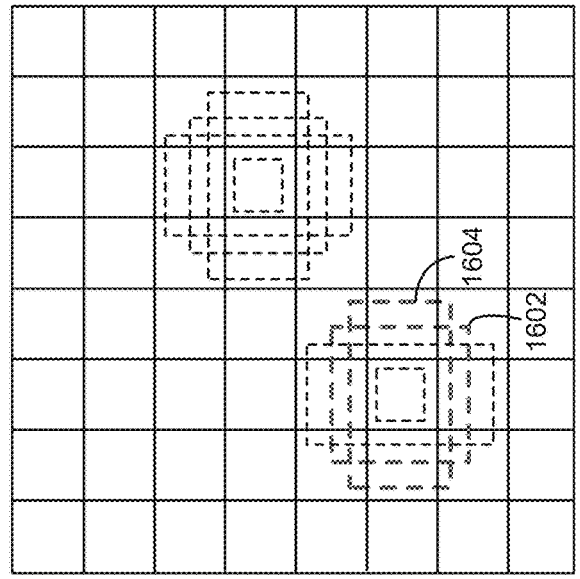
Figure 16A:
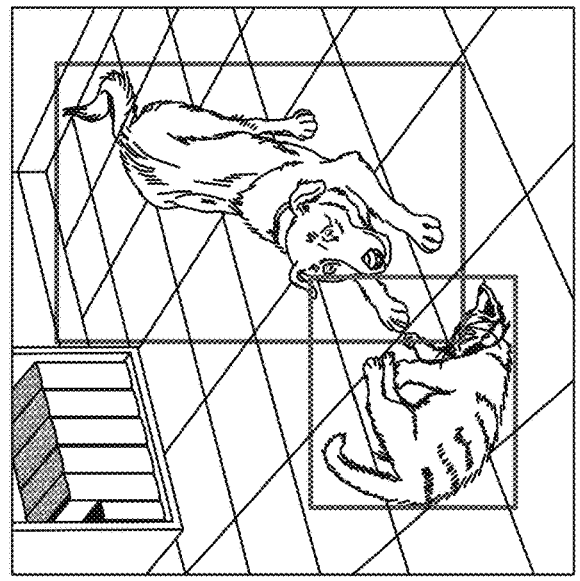

Another deep learning-based detector that can be used by the object detection engine 204 to detect or classify objects in images includes the SSD detector, which is a fast single-shot object detector that can be applied for multiple object categories or classes. The SSD model uses multi-scale convolutional bounding box outputs attached to multiple feature maps at the top of the neural network. Such a representation allows the SSD to efficiently model diverse box shapes. FIG. 16A includes an image and FIG. 16B and FIG. 16C include diagrams illustrating how an SSD detector (with the VGG deep network base model) operates. For example, SSD matches objects with default boxes of different aspect ratios (shown as dashed rectangles in FIG. 16B and FIG. 16C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (box 1602 and box 1604 in FIG. 16B) are matched with the cat, and one of the 4×4 boxes (box 1606 in FIG. 16C) is matched with the dog. SSD has multiple features maps, with each feature map being responsible for a different scale of objects, allowing it to identify objects across a large range of scales. For example, the boxes in the 8×8 feature map of FIG. 16B are smaller than the boxes in the 4×4 feature map of FIG. 16C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 16A, all probability labels would indicate the background class with the exception of the three matched boxes (two for the cat, one for the dog).

Figure 17A:
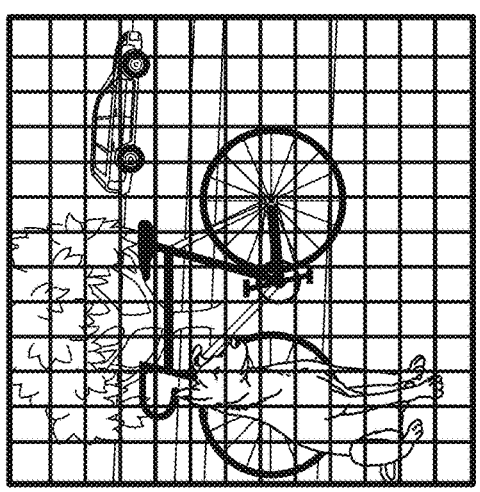
FIG. 17A-FIG. 17C are diagrams illustrating an example of a you only look once (YOLO) detector, in accordance with some examples.
Figure 17B:
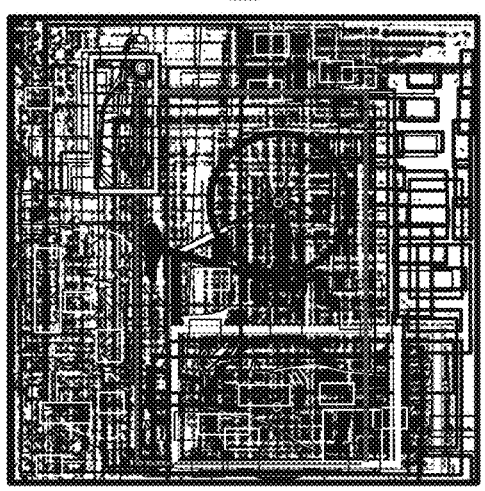

Another deep learning-based detector that can be used by the object detection engine 204 to detect or classify objects in images includes the You only look once (YOLO) detector, which is an alternative to the SSD object detection system. FIG. 17A includes an image and FIG. 17B and FIG. 17C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 17A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 17B. The boxes with higher confidence scores have thicker borders.

Figure 17C:
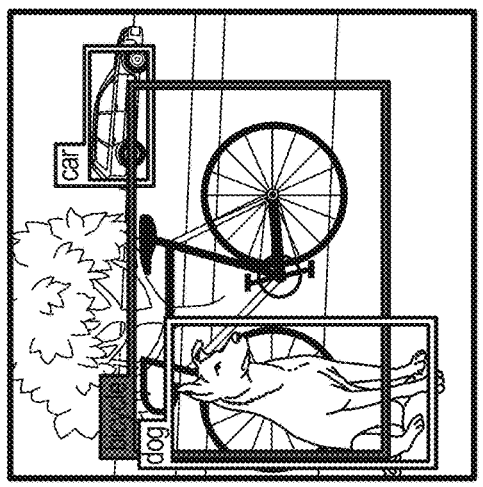

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the gray box with thick borders on the left side of the image in FIG. 17B is 85% sure it contains the object class "dog." There are 169 grid cells (13×13) and each cell predicts 5 bounding boxes, resulting in 1745 bounding boxes in total. Many of the bounding boxes will have very low scores, in which case only the boxes with a final score above a threshold (e.g., above a 30% probability, 40% probability, 50% probability, or other suitable threshold) are kept. FIG. 17C shows an image with the final predicted bounding boxes and classes, including a dog, a bicycle, and a car. As shown, from the 1745 total bounding boxes that were generated, only the three bounding boxes shown in FIG. 17C were kept because they had the best final scores.

FIG. 18 is a flowchart illustrating an example of a process 1800 of performing object verification using radar images using the object verification techniques described herein. At block 1802, the process 1800 includes obtaining a bounding region identifying a first object detected in an image. The first object can include any object being tracked. For instance, in some examples, the first object is a vehicle. In some examples, the object is a robot. In some examples, the object is an aircraft.

At block 1804, the process 1800 includes obtaining a map including a plurality of map points. The plurality of map points correspond to one or more reference locations in a three-dimensional space. For instance, the map can include the point map 207 from FIG. 2. In some aspects, the one or more reference locations include lanes on a road in the three-dimensional space, as described in the illustrative examples provided above.

At block 1806, the process 1800 includes associating the bounding region identifying the first object with at least one map point of the plurality of map points included in the map. In some examples, the process 1800 includes projecting a subset of map points from the plurality of map points onto the image and determining, from the subset of map points, the at least one map point is a closest map point on the one or more reference locations to the bounding region. The process 1800 can include associating the bounding region with the at least one map point based on determining the at least one map point is the closest map point on the one or more reference locations to the bounding region. As described above, in some cases, only map points that have a positive parallel distance can be associated with a bounding region of an object. In some examples, the subset of map points are projected onto the image using calibration data and a pose of a camera used to capture the image. In some cases, the subset of map points include map points that are included within a field of view of a camera used to capture the image and that are within a selection range from the camera.

In some implementations, the process 1800 includes determining the at least one map point intersects with one or more points on an edge of the bounding region. In such implementations, the at least one map point is determined to be the closest map point based on determining the at least one map point intersects with one or more points on an edge of the bounding region. In some cases, the edge of the bounding region includes a bottom edge of the bounding region, as described above.

In some implementations, the process 1800 includes determining a point on an edge of the bounding region and determining the at least one map point is closest to the point on the edge of the bounding region as compared to other map points from the subset of map points. In such implementations, the at least one map point is determined to be the closest map point based on the at least one map point being closest to the point on the edge of the bounding region. In some cases, the edge of the bounding region includes a bottom edge of the bounding region, as described above.

At block 1808, the process 1800 includes determining, using the bounding region and the at least one map point, an estimated three-dimensional position and an estimated size of the first object detected in the image.

In some examples, determining the estimated three-dimensional position and the estimated size of the first object includes obtaining a width of the first object, determining an orientation of the first object is parallel to a surface of the map at the at least one map point, and determining, based on the width of the first object and the orientation of the first object, a vertex location of a three-dimensional bounding box representing the first object. The vertex location corresponds to a corner of the three-dimensional bounding box closest to a camera used to capture the image (e.g., as shown in FIG. 9A and/or FIG. 9B). The process 1800 can include determining, based on the vertex location, the estimated three-dimensional position of the first object, and determining, based on the vertex location and the bounding region, a length and height of the three-dimensional bounding box representing the first object.

In some examples, the process 1800 includes obtaining a classification of the first object, and determining, based on the classification, the width of the first object.

In some examples, the process 1800 includes obtaining a classification of the first object for the image, where the classification defines a type of object. The process 1800 can include determining, based on the classification of the first object, a minimum size and a maximum size of the first object, and can determine the estimated size of the first object based on the minimum size and the maximum size of the first object. For example, as described above, the object class of an object estimated by the likelihood estimation can be used to define upper and lower limits to the size (e.g., the length, width, and/or height) of the target object, which can be used by the estimation model (e.g., Kalman filter) to determine the estimated size of the object.

In some examples, the process 1800 includes determining a weight for the classification based on a distance between the first object and a second object, where the second object includes a camera used to capture the image. The process 1800 can include updating a cumulative weight of the classification based on the weight. The cumulative weight is based on multiple detections from multiple images including the first object. The process 1800 can include determining a likelihood the first object includes the type of object defined by the classification based on the cumulative weight of the classification, and can determine the first object includes the type of object based on the determined likelihood and one or more likelihoods associated with one or more other classifications. The process 1800 can include determining the minimum size and the maximum size of the first object based on the type of object defined by the classification. An illustrative example is described above with respect to Equations (1)-(3). In some examples, the first object is a first vehicle and the second object is a second vehicle. In some aspects, the type of object defined by the classification includes a type of vehicle for the first vehicle.

In some examples, the process 1800 includes obtaining a plurality of radar measurement points, where the plurality of radar measurement points are based on radar signals reflected by the first object. The process 1800 can include determining an additional estimated size of the first object based on the plurality of radar measurements. In some examples, the plurality of radar measurement points are obtained using a plurality of radars included on a second object, where the second object includes a camera used to capture the image. In some implementations, the process 1800 includes determining a maximum spread of the radar measurement points along a direction of orientation of the first object, and determining the additional estimated size of the first object based on the maximum spread of the radar measurement points along the direction of orientation of the first object. In some examples, the process 1800 includes determining a size of the first object using an estimation model, in which case the estimated size and the additional estimated size being used as input to the estimation model. In some implementations, the estimation model is a Kalman filter.

In some aspects, the process 1800 includes obtaining a radar image from an imaging radar, and determining an additional estimated size of the first object based on the radar image. In some examples, the process 1800 includes determining a size of the first object using an estimation model, in which case the estimated size and the additional estimated size being used as input to the estimation model. In some implementations, the estimation model is a Kalman filter.

In some examples, the processes described herein (e.g., process 1800 and/or other process described herein) may be performed by a computing device or apparatus, such as a computing device implementing the system 200 of FIG. 2. In some examples, the computing device can include the architecture of the computing device 1900 of FIG. 19. In one example, the process 1800 can be performed by the computing device 1900 implementing the system 200. The computing device can include any suitable device, such as an autonomous vehicle, a robotic device, a mobile device (e.g., a mobile phone), a desktop computing device, a tablet computing device, a wearable device, and/or any other computing device with the resource capabilities to perform the processes described herein, including process 1800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 19:
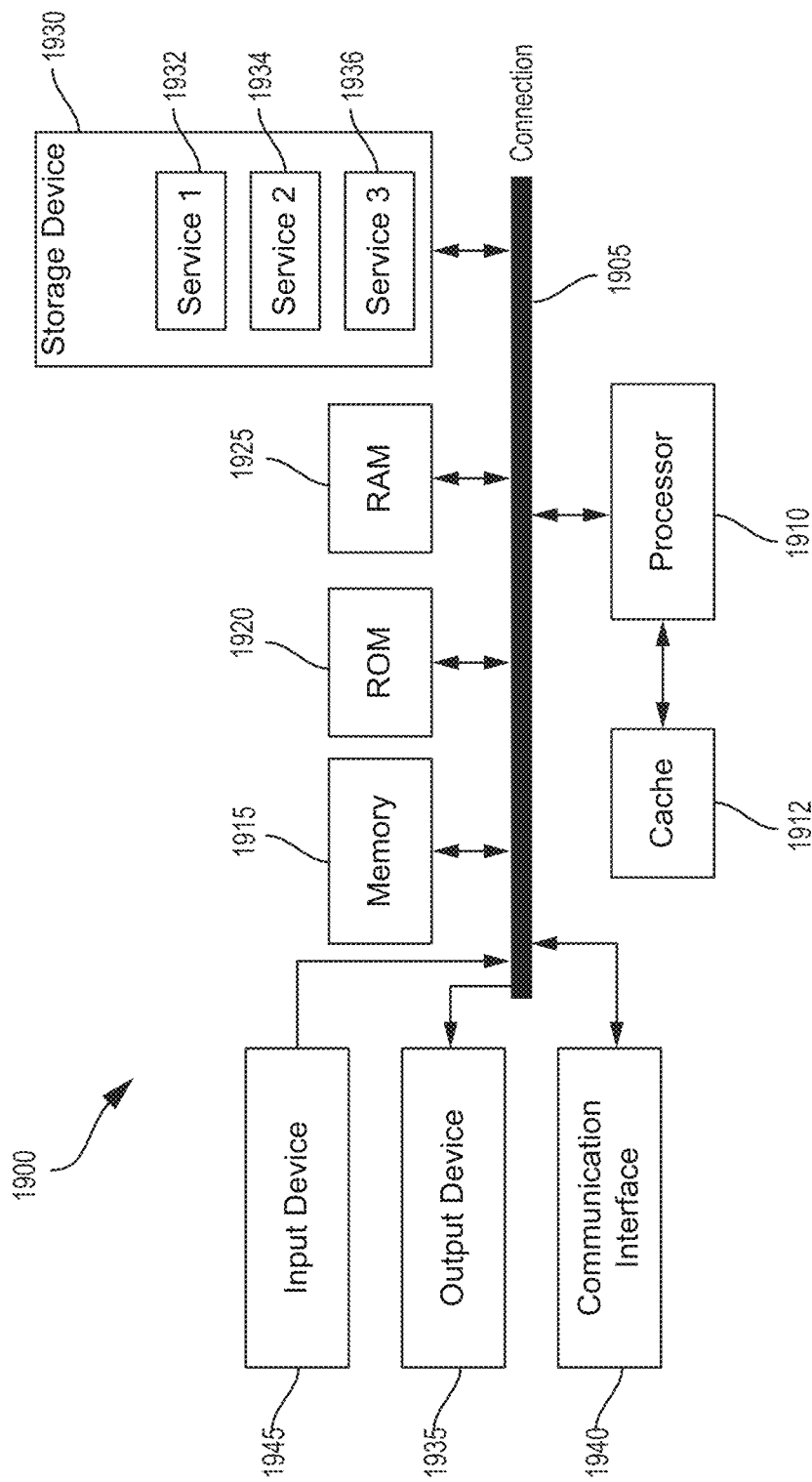
FIG. 19 is a block diagram of an exemplary computing device that may be used to implement some aspects of the technology described herein, in accordance with some examples.

FIG. 19 illustrates an example computing device architecture 1900 of an example computing device which can implement the various techniques described herein. For example, the computing device architecture 1900 can implement the system 200 shown in FIG. 2. The components of computing device architecture 1900 are shown in electrical communication with each other using connection 1905, such as a bus. The example computing device architecture 1900 includes a processing unit (CPU or processor) 1910 and computing device connection 1905 that couples various computing device components including computing device memory 1915, such as read only memory (ROM) 1920 and random access memory (RAM) 1925, to processor 1910.

Computing device architecture 1900 can include a cache of high-speed memory connected directly with, in close proximity to, or integrated as part of processor 1910. Computing device architecture 1900 can copy data from memory 1915 and/or the storage device 1930 to cache 1912 for quick access by processor 1910. In this way, the cache can provide a performance boost that avoids processor 1910 delays while waiting for data. These and other modules can control or be configured to control processor 1910 to perform various actions. Other computing device memory 1915 may be available for use as well. Memory 1915 can include multiple different types of memory with different performance characteristics. Processor 1910 can include any general purpose processor and a hardware or software service, such as service 1 1932, service 2 1934, and service 3 1936 stored in storage device 1930, configured to control processor 1910 as well as a special-purpose processor where software instructions are incorporated into the processor design. Processor 1910 may be a self-contained system, containing multiple cores or processors, a bus, memory controller, cache, etc. A multi-core processor may be symmetric or asymmetric.

To enable user interaction with the computing device architecture 1900, input device 1945 can represent any number of input mechanisms, such as a microphone for speech, a touch-sensitive screen for gesture or graphical input, keyboard, mouse, motion input, speech and so forth. Output device 1935 can also be one or more of a number of output mechanisms known to those of skill in the art, such as a display, projector, television, speaker device, etc. In some instances, multimodal computing devices can enable a user to provide multiple types of input to communicate with computing device architecture 1900. Communication interface 1940 can generally govern and manage the user input and computing device output. There is no restriction on operating on any particular hardware arrangement and therefore the basic features here may easily be substituted for improved hardware or firmware arrangements as they are developed.

Storage device 1930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1925, read only memory (ROM) 1920, and hybrids thereof. Storage device 1930 can include services 1932, 1934, 1936 for controlling processor 1910. Other hardware or software modules are contemplated. Storage device 1930 can be connected to the computing device connection 1905. In one aspect, a hardware module that performs a particular function can include the software component stored in a computer-readable medium in connection with the necessary hardware components, such as processor 1910, connection 1905, output device 1935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of determining one or more sizes of one or more objects, the method comprising:
   obtaining a bounding region identifying a first object detected in an image;
   obtaining a map including a plurality of map points, the plurality of map points corresponding to one or more reference locations in a three-dimensional space;

associating the bounding region identifying the first object with at least one map point of the plurality of map points included in the map; and determining, using the bounding region and the at least one map point, an estimated three-dimensional position and an estimated size of the first object detected in the image.

2. The method of claim 1, wherein the first object is a vehicle.

3. The method of claim 2, wherein the one or more reference locations include lanes on a road in the three-dimensional space.

4. The method of claim 1, further comprising:
projecting a subset of map points from the plurality of map points onto the image;
determining, from the subset of map points, the at least one map point is a closest map point on the one or more reference locations to the bounding region; and
associating the bounding region with the at least one map point based on determining the at least one map point is the closest map point on the one or more reference locations to the bounding region.

5. The method of claim 4, wherein the subset of map points are projected onto the image using calibration data and a pose of a camera used to capture the image.

6. The method of claim 4, wherein the subset of map points include map points that are included within a field of view of a camera used to capture the image and that are within a selection range from the camera.

7. The method of claim 4, further comprising:
determining the at least one map point intersects with one or more points on an edge of the bounding region;
wherein the at least one map point is determined to be the closest map point based on determining the at least one map point intersects with one or more points on an edge of the bounding region.

8. The method of claim 7, wherein the edge of the bounding region includes a bottom edge of the bounding region.

9. The method of claim 4, further comprising:
determining a point on an edge of the bounding region; and
determining the at least one map point is closest to the point on the edge of the bounding region as compared to other map points from the subset of map points;
wherein the at least one map point is determined to be the closest map point based on the at least one map point being closest to the point on the edge of the bounding region.

10. The method of claim 9, wherein the edge of the bounding region includes a bottom edge of the bounding region.

11. The method of claim 1, wherein determining the estimated three-dimensional position and the estimated size of the first object includes:
obtaining a width of the first object;
determining an orientation of the first object is parallel to a surface of the map at the at least one map point;
determining, based on the width of the first object and the orientation of the first object, a vertex location of a three-dimensional bounding box representing the first object, wherein the vertex location corresponds to a corner of the three-dimensional bounding box closest to a camera used to capture the image;
determining, based on the vertex location, the estimated three-dimensional position of the first object; and
determining, based on the vertex location and the bounding region, a length and height of the three-dimensional bounding box representing the first object.

12. The method of claim 11, further comprising:
obtaining a classification of the first object; and
determining, based on the classification, the width of the first object.

13. The method of claim 1, further comprising:
obtaining a classification of the first object for the image, the classification defining a type of object;
determining, based on the classification of the first object, a minimum size and a maximum size of the first object; and
determining the estimated size of the first object based on the minimum size and the maximum size of the first object.

14. The method of claim 13, further comprising:
determining a weight for the classification based on a distance between the first object and a second object, the second object including a camera used to capture the image;
updating a cumulative weight of the classification based on the weight, the cumulative weight being based on multiple detections from multiple images including the first object;
determining a likelihood the first object includes the type of object defined by the classification based on the cumulative weight of the classification;
determining the first object includes the type of object based on the determined likelihood and one or more likelihoods associated with one or more other classifications; and
determining the minimum size and the maximum size of the first object based on the type of object defined by the classification.

15. The method of claim 14, wherein the first object is a first vehicle and the second object is a second vehicle.

16. The method of claim 15, wherein the type of object defined by the classification includes a type of vehicle for the first vehicle.

17. The method of claim 1, further comprising:
obtaining a plurality of radar measurement points, the plurality of radar measurement points being based on radar signals reflected by the first object; and
determining an additional estimated size of the first object based on the plurality of radar measurement points.

18. The method of claim 17, wherein the plurality of radar measurement points are obtained using a plurality of radars included on a second object, the second object including a camera used to capture the image.

19. The method of claim 17, further comprising:
determining a maximum spread of the plurality of radar measurement points along a direction of orientation of the first object; and
determining the additional estimated size of the first object based on the maximum spread of the plurality of radar measurement points along the direction of orientation of the first object.

20. The method of claim 17, further comprising:
determining a size of the first object using an estimation model, the estimated size and the additional estimated size being used as input to the estimation model.

21. The method of claim 20, wherein the estimation model is a Kalman filter.

22. The method of claim 1, further comprising:
obtaining a radar image from an imaging radar; and
determining an additional estimated size of the first object based on the radar image.

23. The method of claims 22, further comprising:
determining a size of the first object using an estimation model, the estimated size and the additional estimated size being used as input to the estimation model.

24. An apparatus for determining one or more sizes of one or more objects, comprising:
a memory configured to store at least one image; and
a processor implemented in circuitry and configured to:
obtain a bounding region identifying a first object detected in an image;
obtain a map including a plurality of map points, the plurality of map points corresponding to one or more reference locations in a three-dimensional space;
associate the bounding region identifying the first object with at least one map point of the plurality of map points included in the map; and
determine, using the bounding region and the at least one map point, an estimated three-dimensional position and an estimated size of the first object detected in the image.

25. The apparatus of claim 24, wherein the first object is a vehicle.

26. The apparatus of claim 25, wherein the one or more reference locations include lanes on a road in the three-dimensional space.

27. The apparatus of claim 24, wherein the processor is configured to:
project a subset of map points from the plurality of map points onto the image;
determine, from the subset of map points, the at least one map point is a closest map point on the one or more reference locations to the bounding region; and
associate the bounding region with the at least one map point based on determining the at least one map point is the closest map point on the one or more reference locations to the bounding region.

28. The apparatus of claim 27, wherein the subset of map points are projected onto the image using calibration data and a pose of a camera used to capture the image.

29. The apparatus of claim 27, wherein the subset of map points include map points that are included within a field of view of a camera used to capture the image and that are within a selection range from the camera.

30. The apparatus of claim 27, wherein the processor is configured to:
determine the at least one map point intersects with one or more points on an edge of the bounding region;
wherein the at least one map point is determined to be the closest map point based on determining the at least one map point intersects with one or more points on an edge of the bounding region.

31. The apparatus of claim 30, wherein the edge of the bounding region includes a bottom edge of the bounding region.

32. The apparatus of claim 27, wherein the processor is configured to:
determine a point on an edge of the bounding region; and
determine the at least one map point is closest to the point on the edge of the bounding region as compared to other map points from the subset of map points;
wherein the at least one map point is determined to be the closest map point based on the at least one map point being closest to the point on the edge of the bounding region.

33. The apparatus of claim 32, wherein the edge of the bounding region includes a bottom edge of the bounding region.

34. The apparatus of claim 24, wherein, to determine the estimated three-dimensional position and the estimated size of the first object, the processor is configured to:
obtain a width of the first object;
determine an orientation of the first object is parallel to a surface of the map at the at least one map point;
determine, based on the width of the first object and the orientation of the first object, a vertex location of a three-dimensional bounding box representing the first object, wherein the vertex location corresponds to a corner of the three-dimensional bounding box closest to a camera used to capture the image;
determine, based on the vertex location, the estimated three-dimensional position of the first object; and
determine, based on the vertex location and the bounding region, a length and height of the three-dimensional bounding box representing the first object.

35. The apparatus of claim 34, wherein the processor is configured to:
obtain a classification of the first object; and
determine, based on the classification, the width of the first object.

36. The apparatus of claim 24, wherein the processor is configured to:
obtain a classification of the first object for the image, the classification defining a type of object;
determine, based on the classification of the first object, a minimum size and a maximum size of the first object; and
determine the estimated size of the first object based on the minimum size and the maximum size of the first object.

37. The apparatus of claim 36, wherein the processor is configured to:
determine a weight for the classification based on a distance between the first object and a second object, the second object including a camera used to capture the image;
update a cumulative weight of the classification based on the weight, the cumulative weight being based on multiple detections from multiple images including the first object;
determine a likelihood the first object includes the type of object defined by the classification based on the cumulative weight of the classification;
determine the first object includes the type of object based on the determined likelihood and one or more likelihoods associated with one or more other classifications; and
determine the minimum size and the maximum size of the first object based on the type of object defined by the classification.

38. The apparatus of claim 37, wherein the first object is a first vehicle and the second object is a second vehicle.

39. The apparatus of claim 38, wherein the type of object defined by the classification includes a type of vehicle for the first vehicle.

40. The apparatus of claim 24, wherein the processor is configured to:
obtain a plurality of radar measurement points, the plurality of radar measurement points being based on radar signals reflected by the first object; and
determine an additional estimated size of the first object based on the plurality of radar measurement points.

41. The apparatus of claim 40, wherein the plurality of radar measurement points are obtained using a plurality of radars included on a second object, the second object including a camera used to capture the image.

42. The apparatus of claim 40, wherein the processor is configured to:
determine a maximum spread of the plurality of radar measurement points along a direction of orientation of the first object; and
determine the additional estimated size of the first object based on the maximum spread of the plurality of radar measurement points along the direction of orientation of the first object.

43. The apparatus of claim 40, wherein the processor is configured to:
determine a size of the first object using an estimation model, the estimated size and the additional estimated size being used as input to the estimation model.

44. The apparatus of claim 43, wherein the estimation model is a Kalman filter.

45. The apparatus of claim 24, wherein the processor is configured to:
obtain a radar image from an imaging radar; and
determine an additional estimated size of the first object based on the radar image.

46. The apparatus of claims 45, wherein the processor is configured to:
determine a size of the first object using an estimation model, the estimated size and the additional estimated size being used as input to the estimation model.

47. The apparatus of claim 24, wherein the apparatus is a vehicle.

48. The apparatus of claim 24, wherein the apparatus is a robot.

* * * * *